(12) United States Patent
Saxena

(10) Patent No.: US 7,209,933 B2
(45) Date of Patent: Apr. 24, 2007

(54) OBJECT VERSIONING

(75) Inventor: Vishal Saxena, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 482 days.

(21) Appl. No.: 10/735,217

(22) Filed: Dec. 12, 2003

(65) Prior Publication Data

US 2005/0131964 A1    Jun. 16, 2005

(51) Int. Cl.
    *G06F 17/00* (2006.01)
(52) U.S. Cl. ...................... 707/203; 707/202
(58) Field of Classification Search ............ 707/100, 707/104, 202, 203, 511
    See application file for complete search history.

(56) References Cited

U.S. PATENT DOCUMENTS

| | | | | |
|---|---|---|---|---|
| 5,181,162 A | * | 1/1993 | Smith et al. | 715/530 |
| 6,347,388 B1 | * | 2/2002 | Hollander | 714/739 |
| 6,460,052 B1 | * | 10/2002 | Thomas et al. | 707/203 |

OTHER PUBLICATIONS

S. Ducasse et al., "A Reflective Model for First Class Dependencies", published in Proceedings of ACM OOPSLA'95, pp. 265-280, 1995.

S. Ducasse, "Inheritance Mechanism Reification by Means of First Class Object", published in Proceedings of the IJCA'95 workshop on Reflection and MetaLevel Architectures and their Applications in AI, pp. 39-49, 1995.

* cited by examiner

*Primary Examiner*—Apu Mofiz
(74) *Attorney, Agent, or Firm*—Silicon Valley Patent Group LLP; Omkar Suryadevara

(57) ABSTRACT

A repository contains multiple versions of an object, and any version of the object can be modified by a user, as and when necessary. A table for one object ("first object") that is contained in another object ("second object") has at least two columns, namely one column for a minimum version of the second object and another column for a maximum version of the second object. If a number of versions of the first object are responsive to a query, then one version of the first object is selected if a version of the second object that is responsive to the query happens to be in the range defined by the just-described minimum version number and the maximum version number. Depending on the embodiment, the second object can be an immediate parent of the first object, or can be an ancestor (also called "first class object") of the first object that is not contained in any other object. In some embodiments, one or more attributes of the first object are stored in a first table along with a unique identifier and a version number. In addition, information on relations of the first object to other objects as well as an identity of a configuration (to which the current version of the first object belongs) are stored in a second table. Therefore, a pair of tables are used for each object, so as to decouple information that defines an object from information on relationships of the object. If a change happens in just the relationship of an object then no change is made to the table containing the definition of the object. Similarly, if a change happens in just the definition of the object, then no change is made to the table containing the relations of the object. Moreover, when a change happens to an object, if the object has a number of ancestors and decendants only an immediate parent of the object is updated, thereby to eliminate a versioning chain reaction (i.e. other objects are not affected).

26 Claims, 8 Drawing Sheets

OBJECT VERSIONING

CROSS-REFERENCE TO RELATED APPLICATION

This application is related to and incorporates by reference herein in its entirety U.S. application Ser. No. 10/734,860 entitled "VERSIONING IN AN INTEGRATION PLATFORM" by Janaki Krishnaswamy, Bhagat Vikram Nainani, Oleg Y. Nickolayev, Vishal Saxena, William George Stallard, and David Wheeler Bruce Thompson, Attorney Docket ORA012 US, Client Docket OID-2003-025-01, that was concurrently filed.

BACKGROUND OF THE INVENTION

Versioning of stored information is a well-known issue in information storage and retrieval industry. Information storage and version management can be achieved in several ways.

Storing new versions in completeness is an easy and fast option but has storage ramifications.

Storing either the first or the latest version and storing the deltas, which can be used to create other versions. This approach is storage efficient but results in slowing down of a response to a query requiring versions that need to be calculated using the deltas.

Besides the above-mentioned limitations of both schemes, one major issue with most versioning solutions is that a versioning chain reaction takes place when an object is versioned. Specifically, versioning of one object normally leads to versioning of a number of other objects that may be in some way related to the object being versioned. Such additional versions are exact clones of the old information and yet need to be handled as new versions.

For example creating a new version of a Department (e.g. in a corporation that is being modeled) according to such a scheme would require creating copies of all Employees within that department.

Storing of multiple versions of a particular object is described in U.S. Pat. No. 6,460,052 granted to Thomas et al. on Oct. 1, 2002 and entitled "Method and system for performing fine grain versioning". U.S. Pat. No. 6,460,052 is incorporated by reference herein in its entirety. Specifically, U.S. Pat. No. 6,460,052 states (see Abstract) that a table includes one or more additional columns for storing version information on each object being stored in the table. In response to a request from a user to retrieve a particular object, a version of the particular object to present to the user is automatically determined based on a workspace associated with the user. The version of the particular object is presented to the user without exposing to the user values from the one or more columns in which version information is stored.

According to U.S. Pat. No. 6,460,052 (see column 5, lines 18–26), in one embodiment, each user has a "working context" that defines the set of objects that can be seen by the user. The user accesses the user's working context through a "version resolved view". The working context of a user defines a set of "configurations" that are associated with the user's workspace. A configuration is a collection of object versions, where each object version in the configuration is for a different object.

U.S. Pat. No. 6,460,052 further states (see column 11, lines 40–50) that when an object is inserted, deleted or updated within a version-resolved view, one or more triggers evaluate access control to determine whether or not the operation can be performed. If the operation is allowed, the triggers of U.S. Pat. No. 6,460,052 construct subordinate SQL that is necessary to insert, delete or update the object within the table, and create the configuration members so that the object can be seen in a subsequent select operation back through the version-resolved view, inserts the object into the current working folder so that it will be seen when navigating the folder, and does the background evaluation of the constraints for generating the corresponding version history information. U.S. Pat. No. 6,460,052 also describes (in column 14, lines 25–45) a set of utilities that automate the process of making software changes.

U.S. Pat. No. 6,460,052, also states (see column 6, lines 14–22) that by providing each user a current working context in which only one version of each object is visible, the database tools can use the repository without having to be aware of the additional complexity that is introduced by version control. In this manner, all work that is performed to track and maintain version information is transparent to the tool. Thus, existing tools that were not designed to support versioning can obtain the benefit of version control without having to be modified. Specifically, the mechanism of U.S. Pat. No. 6,460,052 avoids certain cloning chain reactions because the references to objects remain valid regardless of versions, and the version resolved view projects the appropriate version (e.g. version 2 as opposed to version 1).

U.S. Pat. No. 6,460,052 also describes (see column 7, lines 16–25) a table (called "configuration members") that provides a mapping of configurations to the specific object versions that are associated with the configurations. As previously described, a configuration is a collection of objects that are related in some way that is significant to the user. For example, a configuration may represent all the objects that make up a given component or release. Using the configuration members table, a version control mechanism identifies the specific objects and the specific object versions that make up a particular configuration.

Moreover, the version control mechanism (see column 5, lines 12–21) maintains a user workspace for each user. The user workspace of a user includes an object version of each of the objects that have been "checked-out" by the user. The version control mechanism protects the object versions in a user's workspace from changes by other developers. In one example, each user has a "working context" that defines the set of objects that can be seen by the user. The user accesses the user's working context through a "version resolved view".

The working context table (see column 7, lines 49–59) defines a list of configuration objects that are currently mapped to a user's workspace. In one example, each user is provided with a private working context. The working space provides a view of those data items that the user is currently working on ("version resolved view") and protects those data items from being changed by others. A working context may include both structured and non-structured data. Thus, a private working context may include not only file based information but also information that is stored within a table.

SUMMARY

In accordance with the invention, a computer is programmed to maintain a repository that contains multiple versions of an object, and only supplies a single version of the object when a query is processed, by use of a set which is referred to herein as a "configuration". Specifically, a configuration is a set of pointers to at most one version of each object, if the object is included in the configuration.

Such a configuration may be set up ahead of time, to identify only one version of one or more objects in the repository. In several embodiments, the programmed computer receives with the query, the identity of a configuration to be used in processing the query. Thereafter, the programmed computer automatically selects a version of the object that is responsive to the query and that is identified either directly or indirectly by the configuration, from among a number of versions of that object that are otherwise returned by the repository in response to the query. The programmed computer then presents the selected version of the object to the user (or other software/system). In some embodiments of the programmed computer, no information about versioning is exposed, although in other embodiments a version number of the object is made available under certain circumstances. In several embodiments of the programmed computer, a number of configurations are established, and each configuration contains no more than one version of any object in the repository.

Several embodiments maintain a bidirectional mapping between each version of an object and a configuration to which the version belongs. In such embodiments, when a query is issued by a user, a configuration that is to be used (with the above-described set) to select a unique version of each object is also identified (either manually or automatically depending on the embodiment). Therefore, use of the just-described mapping with each query allows the presentation of a single version of an object to the user, in a view that is referred to as "version resolved view." In some embodiments, the above-described mapping may be stored in a set that also holds information on the relationship of each version of the object with a version of one or more other objects, although such a set is not used in other embodiments. Use of the just-described set that is expanded to contain the relationship eliminates the need to change a definition of an object in the repository if the only change is in the relationship.

Although in some embodiments all objects may have the above-described mapping, in other embodiments, the above-described mapping (also called "configuration mapping") is used for an object (also called "primary objects") that exists independently of all other objects and another mapping (also called "version-range mapping") is used for another object (also called "secondary object") that depends (either directly or indirectly) from the primary object. The just-described version-range mapping is based not on configuration but instead on range of version numbers of the primary object from which the secondary object may depend. The range of version numbers is defined in several embodiments by two boundaries, namely a maximum version number Vmax and a minimum version number Vmin.

Depending on the embodiment, a version-range mapping for a secondary object identifies the maximum version number Vmax and the minimum version number Vmin of an object (called "immediate parent object") that directly contains the secondary object regardless of whether the immediate parent object is primary or secondary. If an immediate parent object happens to be itself a child of another object (in which case the immediate parent object is an intermediate object in a tree), then the immediate parent object may have associated therewith (1) a version-range mapping and/or (2) a version-configuration mapping, depending on the embodiment.

In some embodiments, when an object is to be inserted into the repository for the first time, the object is marked as being version 1 and inserted in the normal manner and in addition, a new row for the object is added in the mapping to identify the relationships of this object with other objects. Thereafter, a check is made as to whether the object has an immediate parent and if not then no further action is required. If the newly-added object has an immediate parent, then a check is made as to whether a configuration to which the parent object belongs has been copied, for example for deployment. The copying of the configuration is also referred to herein as taking of a "snapshot" of a current version of all objects in the configuration. If the configuration containing the parent object was not copied (i.e. the parent's snapshot was not taken) then a version range is set up for the newly-added object with the current version of the parent object as Vmin and infinity as Vmax. If configuration was copied (i.e. a snapshot of the parent was taken), then a new version of the parent object is made (e.g. a copy is made with an incremented version number), and a mapping for the parent object is also updated with the incremented version number. The version range of the child object is set up with the incremented version of the parent object as the value of Vmin, and infinity is used as the value of Vmax.

When a previously-inserted object is to be updated, a check is made whether a snapshot of the object has been taken (i.e. whether a configuration to which the object belongs has been copied). If the snapshot was not taken, then the object and/or its relationships are changed as necessary. If the snapshot was taken, then a check is made as to whether the object has an immediate parent, and if not then a new version of the object is made, and the new version and/or its relationships are changed. If the object to be updated does have an immediate parent, then a check is made as to whether a snapshot of the parent was taken, and if not then no action is required. If a snapshot of the parent was taken, then a new version of the parent is created (as described above), and parent's mapping is updated with the parent's new version number. Thereafter, a range of the current version of the object is updated, e.g. the maximum version number Vmax is set to the previous version of the parent. Next, a new version of the object is made (with the necessary changes), and the version range for this new version of the object is set up as follows: the minimum version number Vmin is set to the current version of the parent, and the maximum version number Vmax is set to infinity.

When deleting a previously-inserted object, a check is made whether a snapshot of the current version of the object has been taken (i.e. whether a configuration to which the object belongs has been copied). If the snapshot was not taken, then the object and its relationships are deleted if the object is a primary object. If the to-be-deleted object is a child object, and another object is its parent, then a check is made as to whether the Vmin of the child object is same as the current version number of the parent, and if so the child object and its relationships are deleted.

When deleting a previously-inserted object, if a snapshot of the object was taken, then an entry for the object is removed from the current configuration. Next, a check is made as to whether the object has a parent, and if so, a new version of the parent is created and the parent's mapping is updated, followed by updating the Vmax of the child object to the latest version of the parent.

In one specific embodiment, the above-described repository as well as the configurations and relationships are implemented by tables in a relational database. Specifically, all the versions of an object are stored in a table (also called "base table"), and for each object there is a single table. In this embodiment, the base table for each object contains a number of columns that are normally used to hold such objects, and one additional column to hold a version number of the object. In addition to base tables, there is a mapping table for each object, and the mapping table contains a column for the configuration and two columns for Vmax and Vmin depending on the type of mapping (which in turn depends on whether or not the object is a child of another object). Depending on the embodiment, a mapping table may also contain: columns for the relationships of the object with other objects. Furthermore, in several embodiments, a mapping table of an object also contains column(s) for an identifier and version number of the object, which are used as a foreign key into the base table of the object.

One exemplary implementation assigns a unique identifier to each object regardless of the type of data and/or software in the object. In such an implementation, the mapping table has one column for the object identifier, another column for the object's version, so that the two columns together in combination uniquely identify a single version of a single object.

DETAILED DESCRIPTION

Figure 1A:
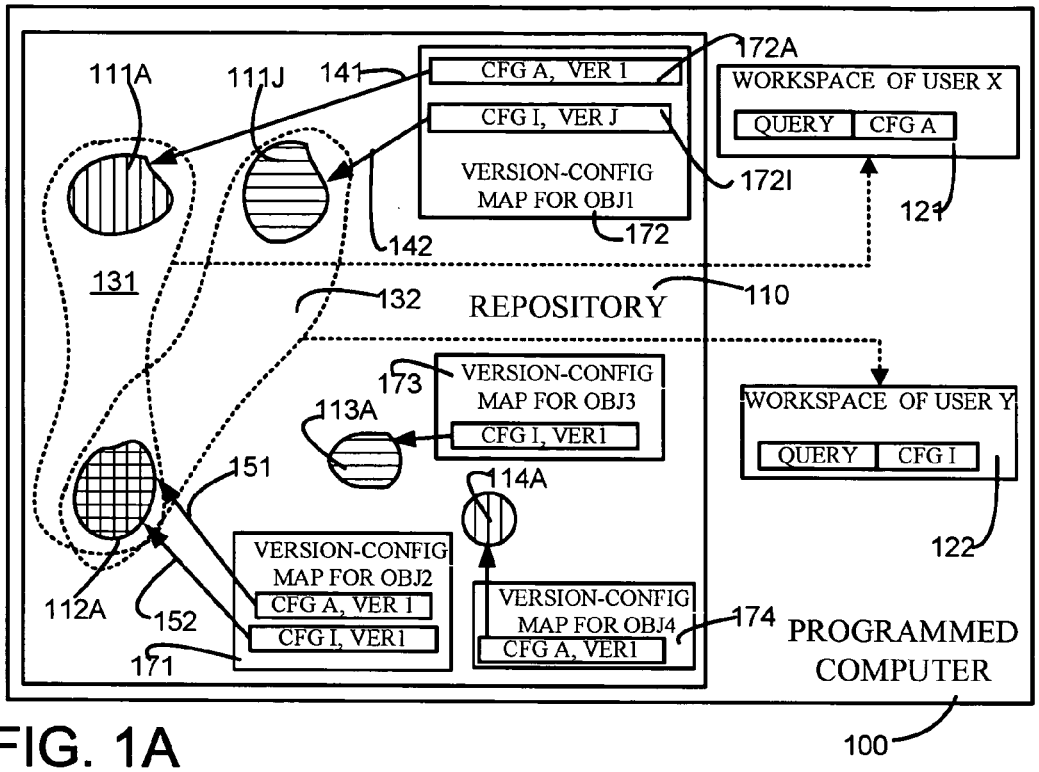
FIG. 1A illustrates, in a high-level block diagram, a computer programmed in accordance with the invention to map a configuration with a version of an object, for use in processing a query to identify a single version of the object responsive to the query, from a repository that contains multiple versions of one or more objects.

A computer 100 (FIG. 1A) is programmed in accordance with the invention to maintain a repository 110 that contains multiple versions of an object. For example, an object called "OBJ1" is shown in FIG. 1A as having two versions, namely version 1 (labeled as item 111A in FIG. 1A) and version 2 (labeled as item 111J in FIG. 1A). Normally, when a query is made to repository 110, repository 110 returns both versions (i.e. version 1 and version 2) of the single object OBJ1 in response to the query. However, computer 100 is programmed to supply only a single version, e.g. version 1 only or version 2 only, depending on a configuration that is received with the query. For example, when processing a query from workspace 121, computer 100 uses an identifier, namely a configuration CFG A and the identity of a responsive object OBJ1, with a mapping 172 for OBJ1 (which is a mapping between versions of OBJ1 and configurations to which they belong) to uniquely identify (as illustrated by arrow 141) that it is version 1 (i.e. item 111A) that is to be returned to workspace 121 (in response to the query).

The just described mapping 172 (also called version-configuration mapping) may contain a number of pairs of identifiers of configurations and version numbers, such as pair 172A and pair 172I, so that there is at least one pair for each configuration in which a version of this object exists. Note that a single version may be included in several configurations, and also that there may be any number of configurations which do not contain any version of a given object.

Figure 1B:
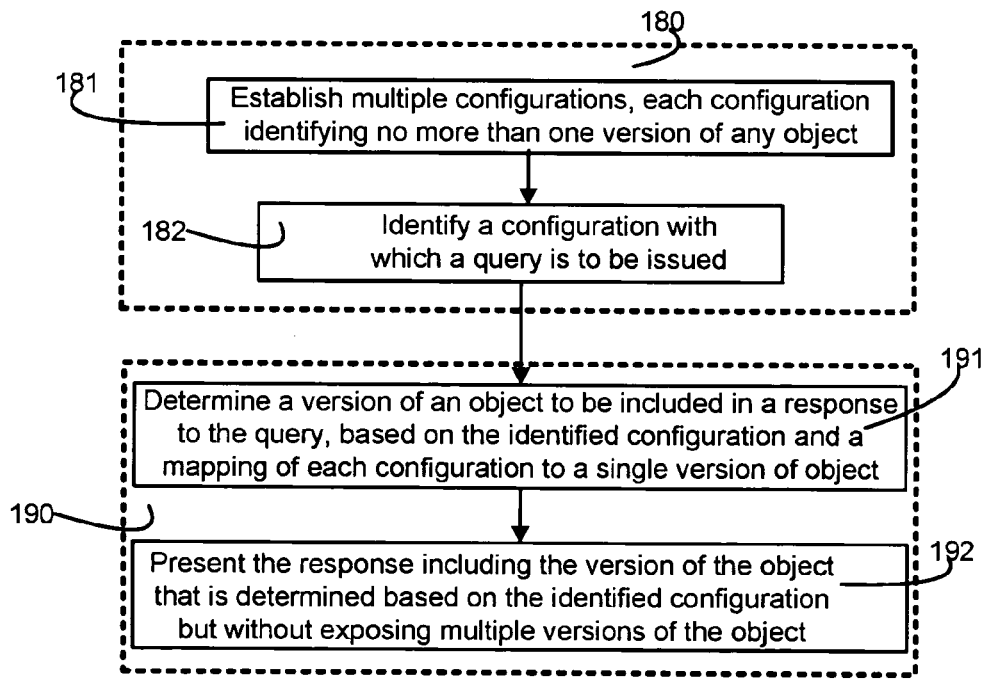
FIG. 1B illustrates, in a flow chart, acts performed by the computer of FIG. 1A in certain embodiments of the invention.
Figure 1C:
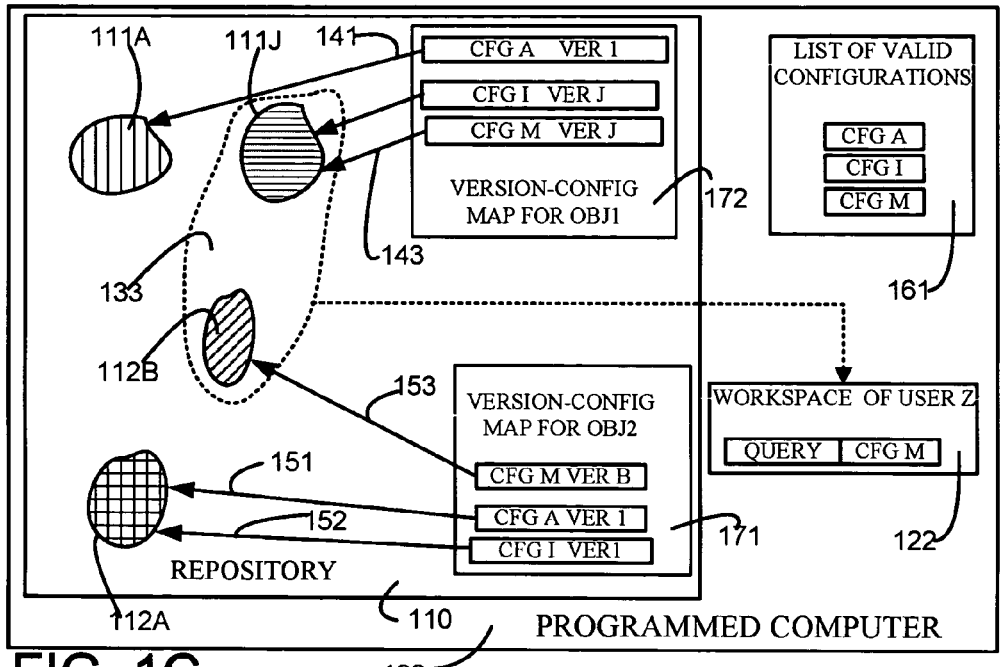
FIG. 1C illustrates, in a high level block diagram, use of the programmed computer of FIG. 1A when updating an object to create a new version of the object.

During query processing, version-configuration map 172 is identified from an object OBJ1 that is responsive to the query. In the example illustrated in FIG. 1A, map 172 contains one pair 172A of identifiers [CFG A, VER 1] to uniquely identify version 1 of OBJ1 as being included in configuration CFG A, and another pair 172I of identifiers [CFG I, VER J] to uniquely identify version J of OBJ1 as being included in configuration CFG I. In FIGS. 1A–1C, all objects that are included in configuration CFG A are shown hatched with vertical lines, and all objects that are included in configuration CFG I are shown hatched with horizontal lines. Note that in FIG. 1A, another map 171 contains two pairs of identifiers [CFG A, VER 1] and [CFG I, VER 1] that respectively identify the same version 1 of another object OBJ2 as being contained in both configurations CFG A and CFG I, as illustrated by arrows 151 and 152. For this reason, in FIG. 1A, this object is shown hatched with both horizontal and vertical lines.

In several embodiments, a configuration CFG A is set up ahead of time, to directly identify only one version of one or more objects in repository 110 (FIG. 1A). For example, in FIG. 1A, the configuration CFG A is set up to contain version 1 of each of objects OBJ1, OBJ2 and OBJ4, which are namely items 111A, 112A, and 114A. Similarly, the configuration CFG I is set up to contain version 2 of object OBJ1 (namely item 111J), version 1 of object OBJ2 (namely item 112A), and version 1 of object OBJ3 (namely item 113A).

The above-described configurations (and the related version-configuration maps) may be set up manually in some embodiments, although in other embodiments they are set up automatically. Moreover, in some embodiments, each query is associated with only one configuration, e.g. configuration CFG A. Although any number of queries can be associated with a configuration, each query is associated with only one configuration in such embodiments, so that computer 100 automatically identifies a single version of an object from among multiple versions in repository 110. Computer 100 presents a selected version (e.g. version 1) of the object (e.g. object 111A), without exposing the multiple versions of the object e.g. as a version resolved view.

In an example illustrated in FIG. 1A, the two queries from workspaces 121 and 122 are identical, and in response repository 110 retrieves data from two objects, namely OBJ1 and OBJ2. Version-configuration map 172 is shown in FIG. 1A as containing two pairs of identifiers, each of which directly identifies one version of object OBJ1. Moreover, version-configuration map 171 is shown as containing two pairs of identifiers, each of which directly identifies the same version of object OBJ2. As will be apparent to the skilled artisan, such a map can contain as many such pairs as there are configurations, although some sets may contain fewer pairs than the number of versions for example if an object was deleted in a configuration. Therefore, in response to the query from workspace 121, only objects 111A and 112A are presented in a version resolved view 131, although repository 110 contains an additional object 111J that is also responsive to the query. Note that when another user Y issues the same query from workspace 122, only objects 111J and 112A are presented in another version resolved view 132.

In some embodiments, user X can issue a query with any configuration, e.g. CFG A or CFG I, and furthermore user Y too can issue the query with any configuration. However, in some embodiments, neither of the two users X and Y needs to be aware of any versioning information when they issue their queries. Instead, each user's workspace 121, 122 is set up ahead of time (either automatically or manually), to contain a single identifier of a configuration that is to be used in generating a version resolved view.

In several embodiments of computer 100, a number of configurations A . . . Z are established (as per act 181 in FIG. 1B), and each configuration I (wherein A≦I≦Z) contains no more than one version of any object in repository 110. Moreover, computer 100 of such embodiments groups all configurations that contain a given object (e.g. object OBJ1) into a set (e.g. to form map 172). When issuing a query, a configuration to be used with a query is identified (as per act 182 in FIG. 1B).

When processing a query, computer 100 of several embodiments performs the following acts: (a) uses the identified configuration to directly identify a single version of each object that is to be included in a response to the query (as per act 191 in FIG. 1B), and (b) presents the response including the version of the object that is identified from among multiple versions of the object, but without exposing the multiple versions (e.g. in views called "version resolved views"). Each of acts (a) and (b) individually is believed to patentably distinguish the operation of programmed computer 100, in view of the use of multiple configurations in U.S. Pat. No. 6,460,052 as discussed elsewhere herein.

Note that the chain reactions avoided by some embodiments in accordance with this invention are of two kinds: "horizontal," in the sense that if two objects are related to one another, and if one object is versioned the other object need not be versioned, and also "vertical," in the sense that if one object owns (i.e. is an ancestor of) another object and if the ancestor object is versioned then all its progeny objects need to be versioned. In contrast, the inventor notes that U.S. Pat. No. 6,460,052 may eliminate at most one kind of chain reactions which are referred to herein as "horizontal" but the methods of U.S. Pat. No. 6,460,052 do not avoid another kind of chain reactions that are referred to herein as "vertical."

Although acts 181–182 (that form an operation 180 for identifying configurations), and acts 191–193 (that form another operation 190 for using the identified configuration to generate version resolved views) are discussed above in reference to certain embodiments of computer 100, other embodiments may only perform one of these acts, or a combination of a subset of these acts, in addition to performing other acts. For example, certain embodiments of programmed computer 100 may perform only acts 181 and 182 of operation 180, and may implement operation 190 in a different manner. As another example, some embodiments of programmed computer 100 may perform only acts 191 and 192 of operation 190, and may implement operation 180 in a different manner.

When an object is to be updated, in some embodiments, a copy of the object is made and the change is implemented in the copy. For example, a copy 112B is made of object 112A, and then copy 112B (FIG. 1C) is changed (at least by incrementing the version number). In addition, to allow a user to access new object 112B, it is necessary to add to map 171 which identifies configurations and versions contained in the configurations. Specifically, version-configuration map 171 for OBJ2 is augmented by addition of a pair of identifiers [CFG M, VER B], wherein CFG M identifies a new configuration and VER B identifies the newly-created item 112B which is a new version of OBJ2. In FIG. 1C, item 112B is hatched using slanted lines to indicate its inclusion in configuration CFG M.

Presence of the identifiers [CFG M, VER B] in map 171 allows object 112B to be accessed from workspace 122. Note that since a new configuration CFG M has been created, it is now necessary to also augment map 172 for object OBJ1 with another pair of identifiers [CFG M, VER J] even though there has been no change in version J of OBJ1 (which is shown in FIG. 1C as hatched with both horizontal lines and slanted lines). Presence of identifiers [CFG M, VER J] in map 172 allows a query that is issued with configuration CFG M to be processed, so that the appropriate versions VER J and VER B respectively of objects OBJ1 and OBJ2 are provided in the response to the query, as a version resolved view 133 (FIG. 1C).

In some embodiments, a map of an object's version to/from a configuration of the type described above may be augmented with additional information, such as the relationship of object OBJ1 with other objects. Therefore, if an object OBJ2 is related to object OBJ1 in one or more configurations, then this information may be stored in map 172 for object OBJ1, along with the version number. Such a map is also referred to herein as a "version-configuration-relation" map. Use of a "version-configuration-relation" map is believed to be patentably distinguishable over U.S. Pat. No. 6,460,052.

Figure 1D:
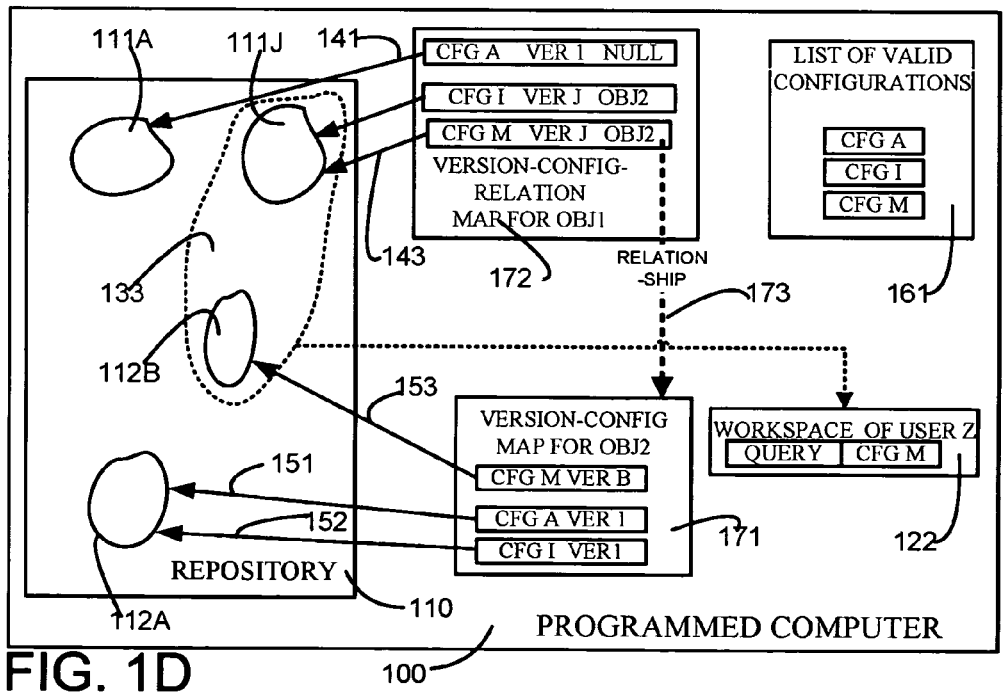
FIG. 1D illustrates, in a high level block diagram, use of the programmed computer of FIG. 1A to maintain relationships among objects.

Specifically, as illustrated in FIG. 1D, configuration CFG M identifies not only version VER J but also identifies an object OBJ2 (as being associated with object OBJ1 in this configuration), as shown by arrow 173. Arrow 173 illustrates that object OBJ2 (e.g. Department) may be related to multiple objects OBJ1 (e.g. Employees), and note that in FIG. 1D, object OBJ2 is not a parent of object OBJ1. In configuration CFG A, object OBJ1 is not related to object OBJ2, although the relationship does exist in configurations CFG I and CFG M.

Figure 2A:
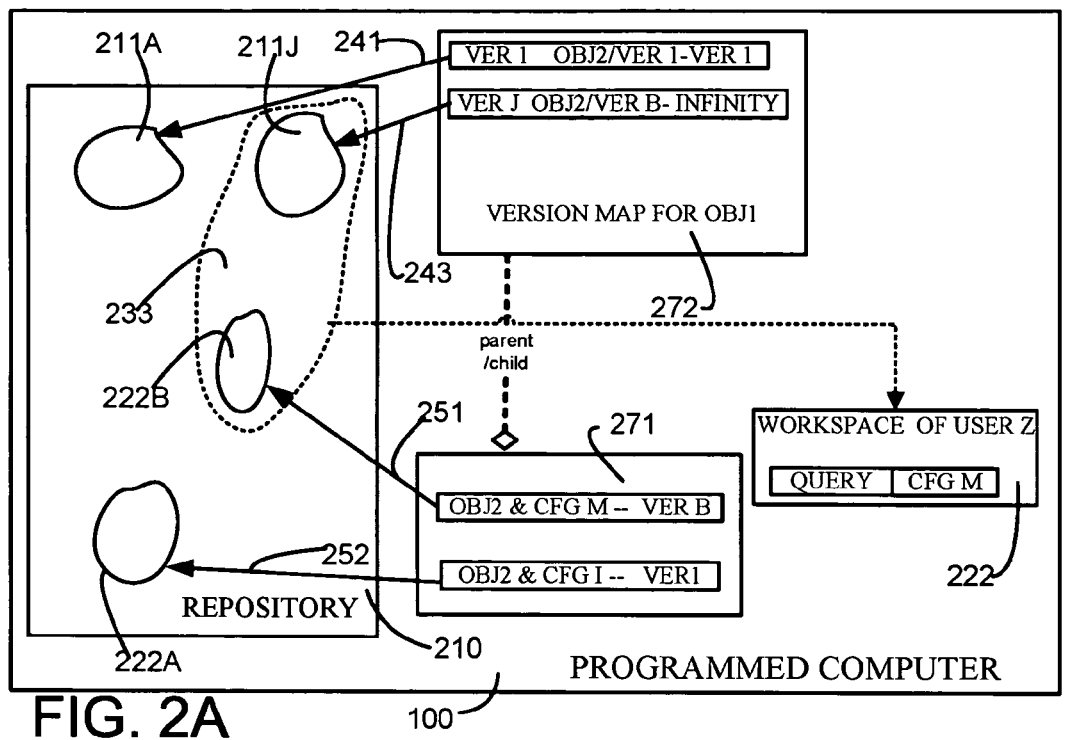
FIG. 2A illustrates, in a high level block diagram, a computer programmed in accordance with the invention to associate a configuration with each version of an object, and to associate a version range of the just-described object with another object.
Figure 2B:
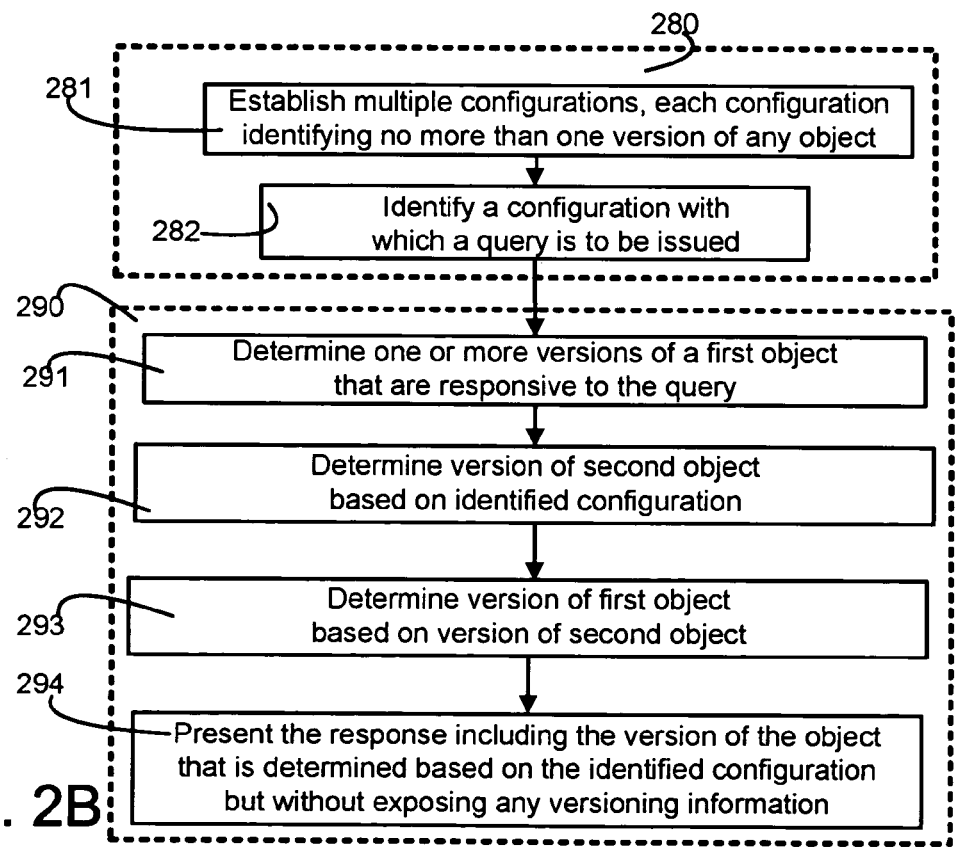
FIG. 2B illustrates, in a flow chart, acts performed by the computer of FIG. 2A in certain embodiments of the invention.
Figure 2C:
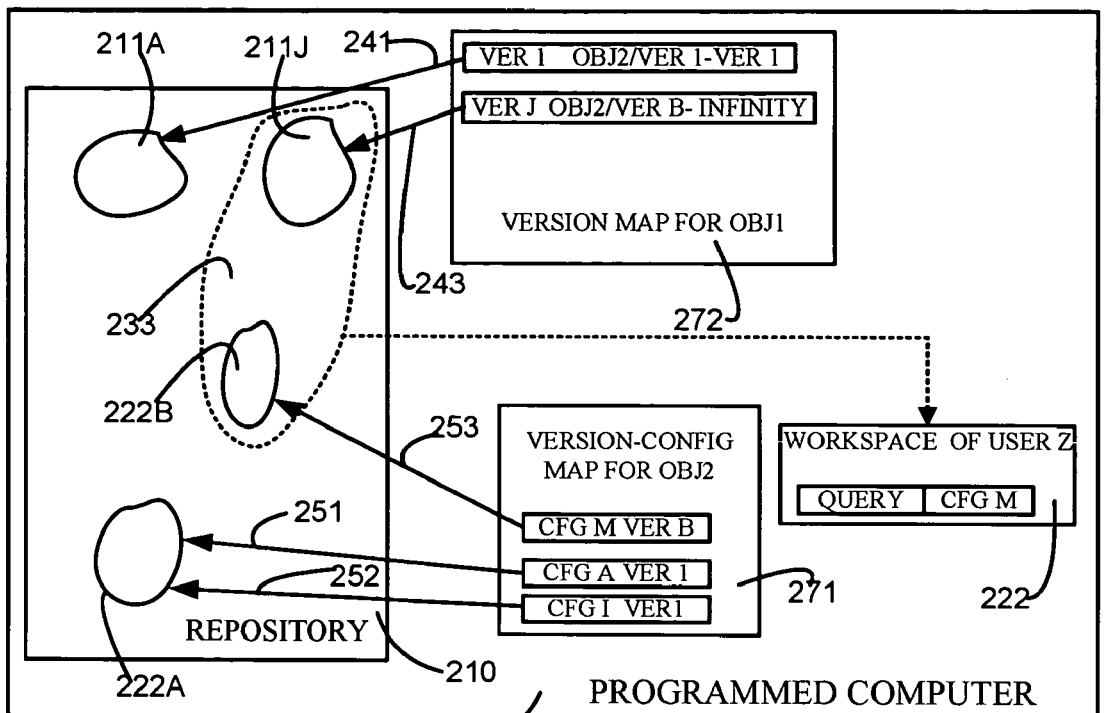
FIG. 2C illustrates, in a high-level block diagram, one embodiment of the programmed computer of FIG. 2A wherein configuration and version associations are organized on per object basis to form a configuration map.

Note that although version-configuration maps of some embodiments are illustrated in FIGS. 1A and 1C as being included in a repository 110 that contains a definition of objects OBJ1 and OBJ2, such maps may be implemented outside of repository 110 in alternative embodiments as illustrated in FIGS. 1D, 2A and 2C.

Note that although the objects in FIG. 1D are not shown hatched, they belong to the various configurations as described above. Therefore, if version J of object OBJ1 is responsive to the query, then object identity OBJ2 can be obtained from map 172, and use of object OBJ2 with configuration CFG M in map 171 identifies a version of object OBJ2 (e.g. version VER B) to be used in responding to the query. In such embodiments, when there is a change in a relationship (e.g. between OBJ1 and OBJ2), the object itself is not changed because the relationship is held in map 172. Therefore, an object definition (e.g. in a base table) need not be versioned regardless of the number of times that the relationship is changed (e.g. in a mapping table). Although examples of tables have been just described, such objects and/or their relationships may be implemented by use of other data structures of the type well known in the art, such as a file system and/or an array.

Although in some embodiments of the type described above, an immediate parent object is versioned, alternative embodiments may version a primary object (called "first class object") that either directly or indirectly contains the secondary object, wherein the first class object forms the root of a tree of such secondary objects. In such alternative embodiments that maintain version-range mapping relative to the first class object, the mapping for an intermediate object can be (1) a version-range mapping and/or (2) a version-configuration mapping, depending on the embodiment.

Although in FIGS. 1A, 1C and 1D both maps 171 and 172 are illustrated as using a configuration to identify a unique version of an object, other embodiments use a version number of one of the objects to uniquely identify a version number of another object. Specifically, as illustrated in FIG. 2A, some embodiments of a map 272 for object OBJ1 maintain a range of version numbers of object OBJ2 with which each version of object OBJ1 can be used (because object OBJ2 is a parent of object OBJ1). Note, however, that in certain alternative embodiments, instead of the just-described version number range of another object, all objects are explicitly associated with a configuration (i.e. in such embodiments, each object in the repository has a configuration map similar to map 171). Referring back to the example illustrated in FIG. 2A, version VER 1 of object OBJ1 is indicated as being useable with just one version, namely version VER 1 of object OBJ2, because the version range is shown as being from VER 1 to VER 1. Furthermore, version VER J of object OBJ1 is indicated as being useable with any version of object OBJ2 that is greater than or equal to version VER B.

Moreover, as illustrated in FIG. 2A, a map 271 for object OBJ2 can be organized in any manner apparent to the skilled artisan in view of this disclosure, so long as the map associates each configuration with a version of object OBJ2. For example, in some embodiments, map 271 can be organized in the manner described above in reference to FIG. 1A and illustrated in FIG. 2C: specifically, map 271 is organized on a per object basis, with one association for each configuration that contains the object (e.g. if a configuration does not contain the object, such a configuration does not appear in map 271). However, in other embodiments, map 271 can alternatively be organized on a per configuration basis, with one association for each object that exists in a given configuration.

Furthermore, as illustrated in FIG. 2B, acts 281–282 (that form an operation 280 for identifying configurations) may be performed in embodiments of the type illustrated in FIGS. 2A and 2C, in a manner similar to the corresponding acts 181–182 described above in reference to FIG. 1B. Also, acts 291–294 (that form another operation 290 for using the identified configuration to generate version resolved views) are similar to the above-described acts 191–193, except for the following differences. Specifically, in act 291 (FIG. 2B) one or more versions of a first object OBJ1 that are responsive to a query are identified, and thereafter in act 292 a specific version VER B of a second object OBJ2 is identified based on the configuration CFG M and the map 271. Next, in act 293, a single version VER J of the first object OBJ1 is identified, by use of version number VER B and map 272. Finally, a version resolved view 233 is presented (as per act 294).

Figure 3:
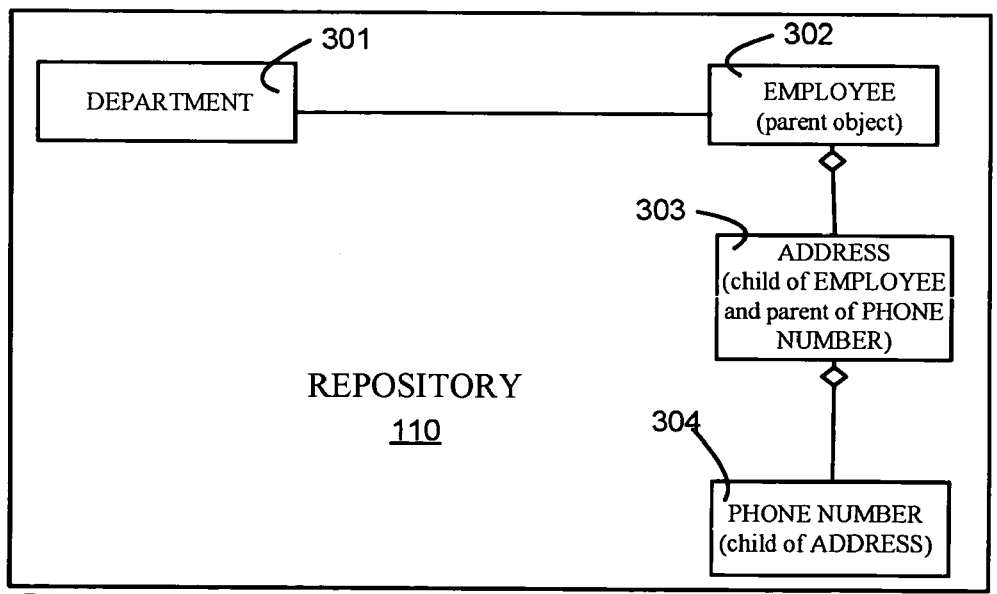
FIG. 3 illustrates, in a class diagram, a sample UML model of a repository containing two primary objects, wherein one primary object has a direct secondary object and an indirect secondary object.

An example of a UML model implemented in a programmed computer 100 is illustrated in FIG. 3, as follows: an object 301 (labeled "DEPARTMENT") is implemented in repository 300 by two tables: (1) a relational table to hold one or more attributes that define the object (such a table may contain, e.g. two columns that identify a name of the department, and a name of the city in which the department is located); and (2) another relational table to hold a configuration map for object 301 (such a table may contain, e.g. at least three columns which identify the configuration, the version, and an identifier of the row in the DEPARTMENT table). In some embodiments, the just-described row identifier (also called "entity identifier") is selected to be a number that is unique across all instances of all objects in repository 300.

In addition, repository 300 (FIG. 3) includes another object 302 (labeled "EMPLOYEE") which is also implemented by two relational tables, one for definitions and another for mapping. The definition table for EMPLOYEE may contain, e.g. at least three columns which identify the employee name, an identifier of a version, and an identifier of a row in the EMPLOYEE table. Repository 300 also includes two additional objects 303 and 304 (FIG. 3) which are respectively labeled "ADDRESS" and "PHONE NUMBER", which are implemented by four additional relational tables.

All objects 301–304 in repository 300 are of two types: objects 301 and 302 that are not contained in (or aggregated into) any other object (and such objects are called "primary objects"), and objects 303 and 304 which are contained in (or aggregated into) another object (and such objects are called "secondary objects"). Specifically, object 304 (which contains phone numbers) is contained in object 303 (which contains addresses), and object 303 in turn is contained in object 302 (which contains employee information). Therefore, object 303 is a direct secondary object of object 302 and object 304 is an indirect secondary object of object 302.

Figure 7:
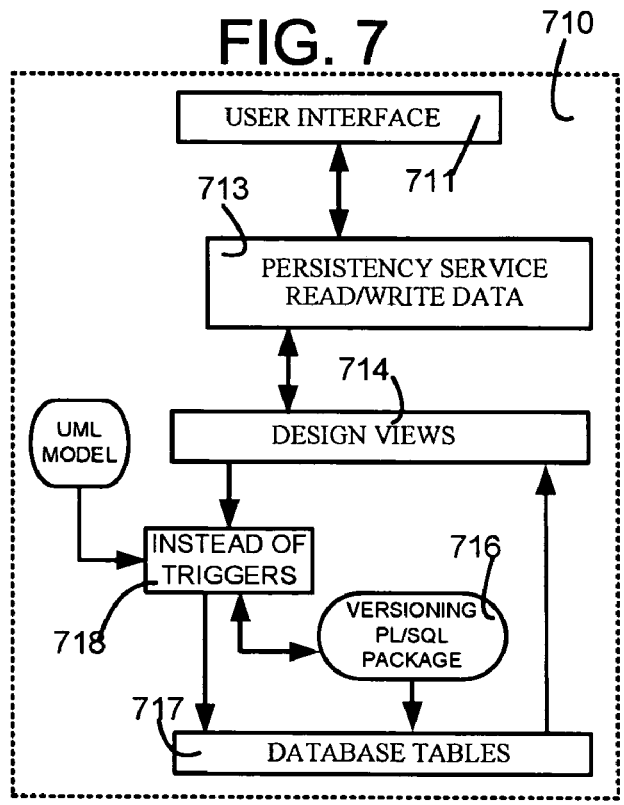
FIG. 7 illustrates, in a high level block diagram, various software components used in some embodiments of a computer programmed in accordance with the invention.

If one were to add a new object to repository 300 as a direct secondary object of object 304, this new object will become an indirect secondary object of both objects 303 and 302. An object hierarchy for EMPLOYEE is EMPLOYEE, ADDRESS, and PHONE NUMBER. The object hierarchy for DEPARTMENT is simply DEPARTMENT. In the above-described example, one department may have many employees and an employee may have one or more addresses, and each address may have one or more phone numbers. Such relationships as well as typing of objects (whether they are primary or secondary) may be identified manually, by a developer, depending on the semantics of the tables in a given specific application. For example, a UML model may provide typing information to instead of triggers 718 as illustrated in FIG. 7.

Note that in some embodiments, software based on pseudo code described next may be used to determine if an object is a first class object:

```
0. BEGIN
    1. Input - UML class -> CLS
    2. create empty list of UML classes -> LIST
    3. add CLS to LIST
    4. LOOP through LIST (N.B. LIST may grow as a result of
operations inside LOOP)
        a. determine supertype of LIST[i] (in terms of inheritance) ->
        SUPER
        b. IF SUPER exists and LIST does not contain SUPER
          add SUPER to LIST (add to the end of LIST)
            END IF
        c. determine all subtypes of LIST[i] -> SUBCLASSES
        d. LOOP through SUBCLASSES
          IF LIST does not contain SUBCLASSES[j]
            add SUBCLASSES[j] to LIST (add to the end of LIST)
          END IF
            END LOOP
            END LOOP
    5. LOOP through LIST
        IF LIST[i] implements any interface
            RETURN TRUE; END
          END IF
    6. RETURN FALSE
    7. END
```

Although the above-described pseudo-code is included herein to illustrate how an object is identified as being first class, any equivalent mechanism well known in the art, may be used in implementing methods of the type described herein.

If there are a number of intermediate objects between a first class object and a secondary object (e.g. in FIG. 3, "address" is an intermediate object between "employee" and "phone number"), then in some embodiments, the fields Vmin and Vmax are used for all these intermediate objects (which are secondary objects) in addition to the above-described secondary object. In such embodiments, all secondary objects have Vmin and Vmax, and only the first class object doesn't have Vmin and Vmax. Note that such embodiments may also maintain a configuration number for all intermediate objects, but they are not necessary in all embodiments. The Vmax and Vmin scheme can be used with the configuration scheme, but each scheme can be used independent of the other scheme, depending on the embodiment.

The just-described type of an object is used in some embodiments, to decide whether a version-range mapping of the type illustrated by map 272 (FIG. 2A) is used or a configuration mapping of the type illustrated by map 172 (FIG. 1A) is used. Specifically, in several embodiments, configuration map 172 is used if the object is a primary object and version-range map 272 is used if the object is a secondary object. In the example illustrated in FIG. 3, consider creating new version of an EMPLOYEE instance that is currently existing. In this case, the EMPLOYEE instance is duplicated with the same ID (an identifier that identifies all versions of this instance), and a version number is incremented. The incremented version number and an identifier of the configuration are also stored in a configuration map for the EMPLOYEE object.

Note that if the only change about an employee is their relationship (e.g. if the employee switches departments), no change need to be made in the EMPLOYEE table (i.e. there is no need for a new version), because the EMPLOYEE table does not contain any relationship information. Instead, the only change that is made is to the configuration map. In such a case, all references to the EMPLOYEE instance in other objects (such as the DEPARTMENT table) remain the valid, since the entity identifier of the EMPLOYEE instance has not changed.

Consider creating a new version of an instance of a direct secondary object ADDRESS that is already existing, after the EMPLOYEE instance (or its configuration map) has been updated as noted above. In this case, a new row will be created for the ADDRESS instance, with the same entity identifier ID as the existing instance. In repository 300, all secondary objects store information about the range of versions of the immediate parent. Therefore, the new version of ADDRESS instance will have Vmin set to the updated version of EMPLOYEE instance (created as described in the previous paragraph). Moreover, the Vmax of a previous version of the ADDRESS instance will be updated to point to the previous version of EMPLOYEE instance. The just-described acts may be performed implicitly, e.g. when an update needs to be made to an existing instance of the ADDRESS object, since it is a secondary object (and in this case a new version of EMPLOYEE instance must have been created and written to database and if not then this is also done implicitly).

The benefits of this approach are: (a) the entity identifier (ID) of an object is constant regardless of the version number; (b) creating a new version of EMPLOYEE does not require any updates to DEPARTMENT, as all references are still valid; and (c) creating a new version of EMPLOYEE does not require cloning its hierarchy. As noted elsewhere, versioning of an instance of a primary object does not require versioning of any other object's instance. Therefore, maintaining entity identifiers identical when cloning an object in such embodiments eliminates the need to clone multiple related objects (potentially all objects) and instead, at most one additional object (only in case of a secondary object, a corresponding primary object that is an immediate ancestor thereof is also cloned). In case there are more than one intermediate ancestors, some embodiments may require a new version of each ancestor, while other embodiments may require a new version of only the primary object, while still other embodiments may require a new version of only the immediate parent object.

In accordance with some embodiments of the type described herein, when a phone object of the type described above in reference to FIG. 3 is versioned, then only the immediate parent object, namely the address object needs to be versioned (in the current configuration), but the employee object need not be versioned. Note further that in alternative embodiments of the type described in the concurrently-filed, co-pending and related patent application entitled "Versioning In An Integration Platform" having the Ser. No. 10/734,860, versioning of a phone object requires only the oldest ancestor object to be versioned, and therefore only the employee object is versioned but any intermediate objects, such as the address object, need not be versioned.

In several embodiments, database schema is responsible for presenting a consistent view of the instances stored in repository 110. Specifically, as noted above, a single version of each instance is presented via views, namely version resolved views. Updates are made to the version resolved views and triggers make the appropriate updates to the related base table(s). The implementation of each view depends on the object type:

| Object Type | View Definition |
|---|---|
| Primary Object | View selects the latest version of each instance (or a specific version, in the case if multiple design configurations are supported). |
| Secondary Object (Direct and Indirect) | View selects the appropriate version of the instance, based on the version of the owning primary object. |

In several embodiments, in addition to columns that are normally present in the table for defining such an object, one or more additional columns are used for such objects, depending on the type thereof. Specifically, each object has an additional column for holding the version number, as shown in the following definition table:

DEFINITION TABLE COLUMNS

| Column | Datatype | Description |
|---|---|---|
| ID | RAW(16) | entity identifier, identical for all versions of the same instance |
| VER | NUMBER | version of the instance, version is changed explicitly by the user in some embodiments although this is not necessary because update triggers can do it implicitly hiding the versioning semantics from the user. |

In the above table, the RAW data type is a 16 bit integer, whereas the NUMBER data type is a 32 bit integer. Therefore, for all objects (regardless of whether the object is primary or secondary), the primary key is a combination of entity identifier ID plus version number VER. Examples of definition tables for two objects are:

DEPARTMENT DEFINITION

| ID | VER | DEPT NAME |
|---|---|---|
| D1 | 1 | MARKETING |

EMPLOYEE DEFINITION

| ID | VER | LAST NAME |
|---|---|---|
| E1 | 1 | Smith |

The actual employee definition table may be as detailed as follows but for simplification it is represented as above.

EMPLOYEE DEFINITION

| ID | VER | First Name | Last Name | Designation | Email | Salary | Experience |
|---|---|---|---|---|---|---|---|
| E1 | 1 | John | Smith | Manager | Jsmith@xyz.com | 173,000 | 20 |

In the examples shown above, the ID values of D1 and E1 are unique across one another and also across all other objects implemented in all other tables. In one example, D1 is set to version 1, and E1 is also set to version 1. For an object of the type described in the above table, the primary key is a combination of ID plus VER.

Furthermore, in several embodiments, each primary object has a configuration map which identifies the configuration that contains each version, and in some embodiments the configuration map also holds relationships to other objects. Therefore, in some embodiments, in addition to columns for relationships of such an object, one or more additional columns are used in a map table for holding the configuration, the version number, and the entity identifier as shown below:

MAP TABLE COLUMNS

| Column | Datatype | Description |
|---|---|---|
| ID | RAW(16) | identical for all versions of the same instance |
| VER | NUMBER | version of the instance |
| CFG | VARCHAR(20) | name of the configuration |
| FK (if any) | Type of the FK | Foreign key relationships of the object. |

In the configuration map table, the CFG column identifies a specific configuration by name. It serves two purposes. First, an arbitrary (not necessarily latest) version of an instance can be included in a configuration that user is designing on, and if necessary multiple such configurations can be supported in the future by using different version numbers with the name (e.g. DESIGN1, DESIGN2 etc). Second, it allows one to record runtime configurations that are created but ie multiple snapshots may be taken not yet deployed. In some embodiments, the design configuration is used when modifying the data in the repository, whereas the runtime configuration is used only for reading the data in the repository. The primary key for each configuration map is a combination of ID plus CFG. Examples of configuration maps for two primary objects are:

DEPARTMENT MAP

| CFG | ID | VER |
|---|---|---|
| C1 | D1 | 1 |

EMPLOYEE MAP

| CFG | ID | VER | FOREIGN KEY (DeptID) |
|---|---|---|---|
| C1 | E1 | 1 | D1 |

As shown above, use of two tables for each object decouples the object's definition from the object's relationship and the configurations that contain the object. This is because, in the above-described example, all the foreign keys and all the relationships are stored in the MAP tables separately from the DEFINITION tables, and hence the relationships can vary independently of the base object definition. Also, as shown in the example, the foreign key for the employee object is defined in the EMPLOYEE MAP table and not in the EMPLOYEE DEFINITION table. For this reason, the relationships between an employee object and a department object (as defined in the foreign key of the employee map table) may be changed any number of times (in any number of configurations), without versioning the objects themselves. Therefore, although entries in the MAP tables change, the DEFINITION tables remain unchanged.

Although in some embodiments described above the relationship information for each object is stored in a map table along with the configuration information, in alternative embodiments such relationship information may be stored in the object's definition table, in the normal manner. In the just-described alternative embodiments, the map tables are still used, but they primarily hold configuration and version information only.

In one example, definition tables for all secondary objects are similar to the corresponding definition tables for primary objects. Examples of definition tables for two objects are shown below:

| ADDRESS DEFINITION | | | |
|---|---|---|---|
| ID | VER | STREET | CITY |
| A1 | 1 | 123 Church Street | San Francisco |

| PHONE NUMBER DEFINITION | | | |
|---|---|---|---|
| ID | VER | HOME | MOBILE |
| P1 | 1 | 408-123-3456 | 408-789-0123 |

Note that in some embodiments, the map tables are different for secondary objects. Specifically, instead of version-configuration maps that are used for primary objects, version-range maps are used for secondary objects. Version-range maps of some embodiments have three columns in addition to columns that hold relationship information and the entity identifier: namely Vmin, Vmax and Parent ID, as shown below.

In several embodiments of the type described herein, the version number column VER is used in processing each query that returns a secondary object, although in embodiments of the type described in the related patent application entitled "Versioning In An Integration Platform" the version number column VER is not used when identifying the secondary objects to be returned (because in such embodiments the version number of the first class object is used to identify the secondary object versions (at all levels) that are to be returned).

| Column | Datatype | Description |
|---|---|---|
| ID | RAW(16) | ID, identical for all versions of the same instance |
| VER | NUMBER | version of the instance, version is changed implicitly (i.e. automatically) when the user creates a new version of the parent of this object and the user then creates another version of the child object and only then updates the newly-created child object. This column is used for information only and is not used in some embodiments. The value of version of the child object is independent of the value of version of the parent object |
| Vmin | NUMBER | indicates the range (lower boundary) of versions of parent object, that this version is contained in |
| Vmax | NUMBER | indicates the range (upper boundary) of versions of parent object, that this version is contained in |
| Parent ID | RAW(16) | ID of the parent object |

Note that the parent referred to in the above table is the immediate parent, although instead of the parent alternative embodiments may use the oldest ancestor that forms a root. Examples of version-range maps for two secondary objects are:

| ADDRESS MAP | | | | |
|---|---|---|---|---|
| ID | VER | Vmin | Vmax | EmployeeID |
| A1 | 1 | 1 | ∞ | E1 |

| PHONE NUMBER MAP | | | | |
|---|---|---|---|---|
| ID | VER | Vmin | Vmax | AddressID |
| P1 | 1 | 1 | ∞ | A1 |

In the case of a version-range map, a view selects an object version that has it's interval [Vmin, Vmax] containing the version of parent ID, the latter being resolved by use of the appropriate configuration, e.g. in a version-configuration map.

Note, that for direct secondary objects, the ParentID column (such as EmployeeID column in the address map) contains the same value as the column generated from the UML model association, linking child to parent. As noted above, this may again hold true for embodiments of the type described in the patent application entitled "Versioning In An Integration Platform", wherein all secondary objects follow version of the primary object. However, usage of the ParentID column simplifies the design significantly (specifically view generation). In addition, if in the future, the UML model were to be changed and some secondary object becomes a first class object, having a pre-existing ParentID column simplifies migration.

As noted elsewhere, in several embodiments of the type described herein, the above-described additional columns related to versioning, namely VER, Vmin, and Vmax are not presented to the user by the version resolved views.

In the just-described tables, a unique key on a definition table is formed by the combination of ID and VER, so these two are never the same (and are used together). Moreover, a unique key on a map table is formed by a combination of the ID, VER and CFG in case of a configuration map. In case of a version-range map, the ID and VER identify the range Vmin-Vmax and the parent's identifier (a foreign key). In a map table there are two pairs of unique keys:

(1) VER and ID used to associate with the definition table, and (2) ID and CFG used for foreign keys (relationships to other objects).

Moreover, a foreign key from all configuration map tables to the definition tables is formed by a combination of ID and VER. Also, CFG and foreign key ID together form a foreign key from one configuration map to another configuration map. For example, a foreign key from EMPLOYEE MAP table to DEPARTMENT MAP table is foreign key(DepartmentID)+CFG. Finally, a foreign key from ADDRESS MAP to EMPLOYEE MAP is foreign key (EmployeeID)+Vmin (although for version resolved views, consider the range Vmin–Vmax).

Figure 4:
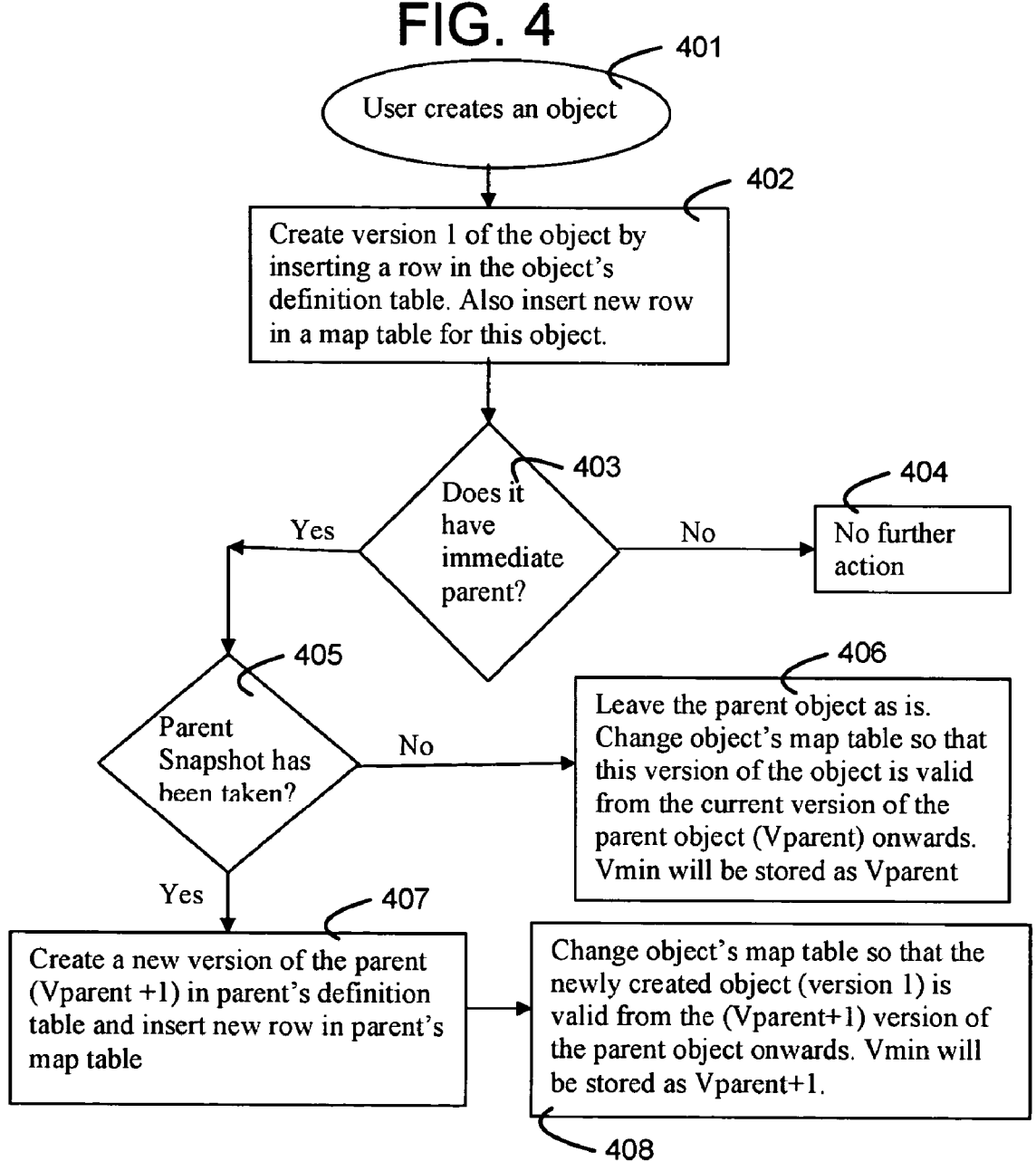
FIGS. 4–6 illustrate, in flow charts, acts that are performed in some embodiments of a computer during insertion, updating and deletion of an object in the repository.

In some embodiments, when an object is to be inserted into the repository for the first time (as per act 401 in FIG. 4), the object is marked as being version 1 and inserted in the normal manner (as per act 402) and in addition, a new row for the object is added in the mapping table to identify the relationships of this object with other objects (also in act 402). Note that in act 402, when a row is added to the mapping table, the value to use for Vmax is infinity (default value) whereas the value for Vmin is initially left blank and is filled in based on the value that is identified in act 406/408.

Thereafter, a check is made as to whether the object has an immediate parent (as per act 403 in FIG. 4) and if not then no further action is required (as per act 404). Note that in terms of objects, there are parent objects without which a child object cannot exist, and there may be associated objects, which are related to each other. However in embodiments that use database tables, both of these objects are represented as foreign keys only. In such embodiments, by looking at the UML model, it is possible to distinguish the two kind of relationships and accordingly write appropriate triggers 718, as illustrated in FIG. 7.

If the newly-added object has an immediate parent, then a check is made as to whether a configuration to which the parent object belongs has been copied (as per act 405 in FIG. 4), for example for deployment. The copying of the configuration is also referred to herein as taking of a "snapshot." If the configuration containing the parent was not copied (i.e. the parent's snapshot was not taken) then the parent object is left unchanged (as per act 406). Moreover, in act 406, a version range is set up for the newly-added object with the current version of the parent object as Vmin and infinity as Vmax. In act 406, certain embodiments may use a list of valid configurations 161 (FIGS. 1C and 1D) which is expanded to include a column indicating "yes" or "no" as to whether or not a snapshot has been taken.

If in act 405 it is found that the configuration was copied (or snapshotted—i.e. a snapshot of the parent was taken), then a new version of the parent object is made as per act 407 (e.g. a copy is made with an incremented version number), and a mapping for the parent object is also updated with the incremented version number (also in act 407). Furthermore, in the version-range map for the newly-added object, Vmin is set to the incremented version number of the parent object, and Vmax is set to infinity.

Consider an example of a new employee "Blake" joining the marketing department, in which case a new row is to be added to the EMPLOYEE DEFINITION table and also to the EMPLOYEE MAP table. After performance of act 402 (described above), the EMPLOYEE tables appears as follows:

| EMPLOYEE DEFINITION | | |
|---|---|---|
| ID | VER | LAST NAME |
| E1 | 1 | Smith |
| E2 | 1 | Blake |

| EMPLOYEE MAP | | | |
|---|---|---|---|
| CFG | ID | VER | FOREIGN KEY (DeptID) |
| C1 | E1 | 1 | D1 |
| C1 | E2 | 1 | D1 |

When adding these rows to the EMPLOYEE tables, in some embodiments a unique value E2 for the ID column is generated across all objects in the repository (e.g. by simply incrementing the last-used ID value). Note that the version number in column VER is 1 because a row for Blake is being inserted for the very first time.

Thereafter, in this example, a check is made (as per act 403) as to whether or not the just-added object has an immediate parent. In this case there is no immediate parent and hence no further action is required (as per act 404). In the described scenario, the employee Blake is joining while a snapshot of the configuration has not been taken. At this stage of the example, if a query is issued as to the employees, if the query is issued with configuration identified as C1, then two rows are returned (e.g. Smith and Blake).

Consider an example of adding a street address "345 Main Street, San Jose" for employee Blake. In this case, a new secondary object instance is added to the repository simply by adding a row to the address definition table (as per act 402) and adding a row to the address map table. After act 402, these two tables appear as follows:

| ADDRESS DEFINITION | | | |
|---|---|---|---|
| ID | VER | STREET | CITY |
| A1 | 1 | 123 Church Street | San Francisco |
| A2 | 1 | 345 Main Street | San Jose |

| ADDRESS MAP | | | | |
|---|---|---|---|---|
| ID | VER | Vmin | Vmax | Employee ID |
| A1 | 1 | 1 | ∞ | E1 |
| A2 | 1 | 1 | ∞ | E2 |

When adding these rows to the ADDRESS tables, a unique value for ID is generated across all objects in the repository (e.g. by simply incrementing the last ID). Note that the version number is 1 because a row for Blake's address is being inserted for the very first time.

In this example, after act 402, a check is made (as per act 403) as to whether or not the ADDRESS table has a parent and in this case the result is yes. Hence, act 405 is performed to check if a snapshot was taken of the immediate parent object, namely if the row for Blake in the EMPLOYEE table has been copied. As there has been no copying of this row, act 406 is performed. In act 406, the parent object is left as is. In regard to Vmin in act 406 (because the row in address map was already inserted in act 402 as shown above), a check is made before the row is inserted in the map table. Also if a snapshot of the parent has been taken, a new version of the parent is created and Vmin is set to the incremented parent version.

Figure 5:
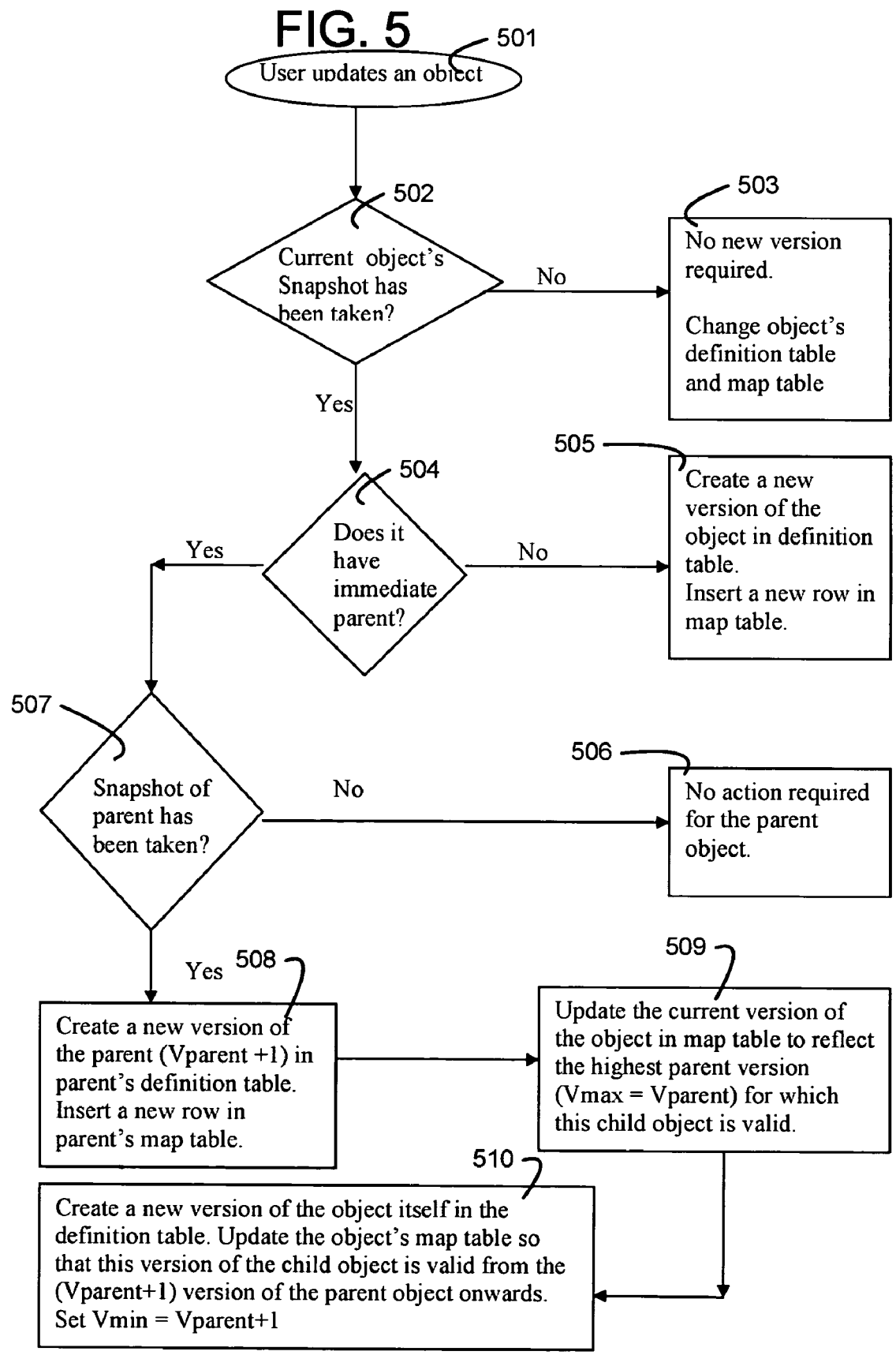

When a previously-inserted object is to be updated (as per act 501 in FIG. 5), a check is made whether a snapshot of the object has been taken as per act 502 (i.e. whether a configuration to which the object belongs has been copied). If a snapshot was not taken, then the object's definition and/or its relationships are changed as necessary as per act 503. Note that in act 503 no new version is made of the object and/or parent object.

In act 502 if it is found that a snapshot was taken, then a check is made as to whether the object has an immediate parent (as per act 504). If there is no immediate parent, then a new version of the object is made (as per act 505), and the new version and/or its relationships are changed (also in act 505). For example, a new row is inserted into a definition table for the object, using an incremented version number, and a new row is also inserted into a map table for the object also using the incremented version number.

If in act 504 it is found that the object to be updated does have an immediate parent, then a check is made as to whether a snapshot of the parent was taken (as per act 507). If the parent's snapshot was not taken, then no action is required as per act 506. If in act 507 it is found that a snapshot of the parent was taken, then the following acts 508–510 are performed. Specifically, in act 508 a new version of the parent is created (as described above), and parent's mapping is updated with the parent's new version number. Thereafter, in act 509 a range of the current version of the object is updated, e.g. the maximum version number Vmax is set to the previous version of the parent (i.e. the highest version of the parent prior to act 508). Next, in act 510 a new version of the object is made (with the necessary changes) by inserting a row in the definition table and a corresponding row in the map table, and the version range for this new version of the object is set up by inserting a row in the mapping table as follows: the minimum version number Vmin is set to the current version of the parent (i.e. the highest version of the parent after act 508), and the maximum version number Vmax is set to infinity.

Consider the tables in the above-described example as they exist prior to the insert operation (for adding Blake). In such a case, when a snapshot of configuration C1 is taken, and thereafter the employee object is versioned (e.g. if the employee's name is changed to upper case) then the following sequence of events happen. Initially, in taking the snapshot, all objects are copied, from configuration C1 to configuration C2.

Alternatively, only the objects being changed may be copied, depending on the embodiment. For example, a new row is added to the employee definition table and to the employee map table to create the employee in configuration C2. Also, since the new version of the employee object in configuration C2 is referring to the department object, a new row is added to the department table for the new configuration C2 (otherwise the department won't exist in the new configuration). The address object and the phone-number objects are not impacted at all and are therefore not copied (instead configuration C2 refers to their current versions).

After copying (either completely or partially as described above), the objects to be changed are then changed. In a programmed computer of the type described herein, a configuration that is changing frequently may be snapshotted (e.g. preserved for future for use in live operations). Note that as long as the configurations are different, order in which such steps are done doesn't matter (some embodiments can copy first and then change the copy, while other embodiments can change the information first and then insert changed information).

After taking the snapshot and after versioning of the employee object, the tables appear as follows (also referred to as STATE 2):

DEPARTMENT DEFINITION

| ID | VER | Name |
|----|-----|------|
| D1 | 1   | MARKETING |

DEPARTMENT MAP

| CFG | VER | ID |
|-----|-----|-----|
| C1  | 1   | D1 |
| C2  | 1   | D1 |

EMPLOYEE DEFINITION

| ID | VER | Name |
|----|-----|------|
| E1 | 1   | Smith |
| E1 | 2   | SMITH |

EMPLOYEE MAP

| CFG | VER | ID | Foreign Key (DeptID) |
|-----|-----|-----|-----|
| C1  | 1   | E1 | D1 |
| C2  | 2   | E1 | D1 |

ADDRESS DEFINITION

| ID | Name | VER |
|----|------|-----|
| A1 | 23 Church Street | 1 |

ADDRESS MAP

| ID | VER | Foreign Key (EmployeeID) | Vmin | Vmax |
|----|-----|-----|-----|-----|
| A1 | 1   | E1 | 1 | ∞ |

In the above tables, a row in the address map table is stating that address A1 is valid for all versions of E1 (1 to infinity). If there is a change in a relationship of such an object, there is no need to create a new version of the object itself. The address object has Vmin and Vmax because it is a child (i.e. it has a parent namely the employee object). Note that the phone number tables remain unchanged (and for this reason they are not shown above). In this example, only objects that do not have a parent do not use Vmin and Vmax.

As shown by the tables listed above, updating the employee object, i.e. creating a new version of the object, does not result in creating new versions of any of the associated objects (Department D1) or the child objects (Address A1). Moreover, the foreign key relationship of the base object is maintained in the new version, the FK column for E1 version 2 in the employee map table still points to the department identified by D1 in the department definition table, which is same as the object to which E1 version 1 was pointing.

Consider an example wherein the new version of the employee is working in another department (say Engineering). In this case, new rows are added to the department definition and department map tables, and a foreign key in the row for the new employee is changed to point to the new department (as shown below). Note that there are no other changes necessary. The tables appear as follows (also referred to as STATE 2.1):

DEPARTMENT DEFINITION

| ID | VER | Name |
|---|---|---|
| D1 | 1 | MARKETING |
| D2 | 1 | ENGINEERING |

DEPARTMENT MAP

| CFG | VER | ID |
|---|---|---|
| C1 | 1 | D1 |
| C2 | 1 | D1 |
| C2 | 1 | D2 |

EMPLOYEE DEFINITION

| ID | VER | Name |
|---|---|---|
| E1 | 1 | Smith |
| E1 | 2 | SMITH |

EMPLOYEE MAP

| CFG | VER | ID | ForeignKey (DeptID) |
|---|---|---|---|
| C1 | 1 | E1 | D1 |
| C2 | 2 | E1 | D2 |

ADDRESS DEFINITION

| ID | Name | VER |
|---|---|---|
| A1 | 23 Church Street | 1 |

ADDRESS MAP

| ID | VER | Foreign Key (EmployeeID) | Vmin | Vmax |
|---|---|---|---|---|
| A1 | 1 | E1 | 1 | ∞ |

In the above tables, after the new department has been added, when the employee's department is being updated, the change is merely in the relationship of the employee object. This change in relationship does not require any other object to be versioned. The department objects remains the same, no new versions need to be created for these objects. Only a change in the employee map table is needed to show that in configuration C2, the employee Smith is now in the Engineering department.

Consider an example wherein after STATE 2, a snapshot has been taken for Configuration C2 and user decides to version the department object (e.g. changes the name to lower case) in configuration C3. Since the version info is decoupled, this will result in a new Dept object in the Dept table. Hence a row is added to the department definition table, and moreover, a row is added to the department map table to identify the new configuration C3. Furthermore, a row is added to the employee map table (but not to the employee definition table) because the employee SMITH is still associated with the same department although in the new configuration. After the above-described changes, the tables appear as follows (also referred to as STATE 3):

DEPARTMENT DEFINITION

| ID | VER | Name |
|---|---|---|
| D1 | 1 | MARKETING |
| D1 | 2 | marketing |

DEPARTMENT MAP

| CFG | VER | ID |
|---|---|---|
| C1 | 1 | D1 |
| C2 | 1 | D1 |
| C3 | 2 | D1 |

EMPLOYEE DEFINITION

| ID | VER | Name |
|---|---|---|
| E1 | 1 | Smith |
| E1 | 2 | SMITH |

EMPLOYEE MAP

| CFG | VER | ID | Foreign Key (DeptID) |
|---|---|---|---|
| C1 | 1 | E1 | D1 |
| C2 | 2 | E1 | D1 |
| C3 | 2 | E1 | D1 |

ADDRESS DEFINITION

| ID | Name | VER |
|---|---|---|
| A1 | 23 Church Street | 1 |

ADDRESS MAP

| ID | VER | Foreign Key (EmployeeID) | Vmin | Vmax |
|---|---|---|---|---|
| A1 | 1 | E1 | 1 | ∞ |

When implementing the version resolved views, the foreign key and the configuration together identify which version of the department is to be included in the view. Hence, if there is a match in the employee definition table, then version 2 of employee id E1 uniquely identifies a row in the employee map table which in turn identifies the configuration as C3, and the foreign key for the department table as D1. A trigger for the version resolved view then uses configuration C3 and department identifier D1 to find version 2 in the department map table, and thereafter version 2 and department identifier D1 are used in the department definition table to identify the department name as being "marketing."

Note that during the multiple state changes 1–2 and 2–3 described above, the address definition table and the address map table remain unchanged although the address object is a child of the employee object. Specifically, a row in the address map table continues to point to the employee whose identifier is E1, in all configurations C1–C3. So for configuration C1, employee id E1 version 1 points to address A1, for configuration C2, employee id E1 version 2 points to address A1, and for configuration C3, employee id E1 version 2 points to address A1.

Consider an example wherein a snapshot has been taken for configuration C3, and the user decides to update the address object in configuration C4. In such a situation, generally, the current version of the object (before the update) is valid for all versions of the immediate parent object up until now, and hence the Vmax value for object is set to the current version of its immediate parent. Then the immediate parent is versioned, and object is also versioned and the new version of the object is valid from the new version of the immediate parent onwards.

In the above-described example, version 1 of the address object is valid for all versions of the employee object (which is the immediate parent) up until now. In this example, the address object has a parent namely the employee object and hence the parent must be versioned. Hence, the Vmax value for current version of the address object (prior to versioning) is set to the current version of the employee object (e.g. changed from ∞ to 2). Then the employee object is versioned (E1 VER 3) simply by copying a previous row in the definition table but with the incremented version number (since the employee is still in the same department). In addition, a new row is added to the employee map table to identify the new configuration C4 in which version 3 of the employee object is to be used. In addition, a new version of address object (A1 VER 2) is created in the address definition table, and a new row is added to the address map table. In the new row in the address map table, the new row in the address definition table is made valid from the new version of the employee object onwards (specifically, Vmin is set to 3 in this example). After the above-described changes, the tables appear as follows (also referred to as STATE 4):

DEPARTMENT DEFINITION

| ID | VER | Name |
|---|---|---|
| D1 | 1 | MARKETING |
| D1 | 2 | marketing |

DEPARTMENT MAP

| CFG | VER | ID |
|---|---|---|
| C1 | 1 | D1 |
| C2 | 1 | D1 |
| C3 | 2 | D1 |
| C4 | 2 | D1 |

EMPLOYEE DEFINITION

| ID | VER | Name |
|---|---|---|
| E1 | 1 | Smith |
| E1 | 2 | SMITH |
| E1 | 3 | SMITH |

EMPLOYEE MAP

| CFG | VER | ID | Foreign Key (DeptID) |
|---|---|---|---|
| C1 | 1 | E1 | D1 |
| C2 | 2 | E1 | D1 |
| C3 | 2 | E1 | D1 |
| C4 | 3 | E1 | D1 |

ADDRESS DEFINITION

| ID | Name | VER |
|---|---|---|
| A1 | 23 Church Street | 1 |
| A1 | 111 Main Street | 2 |

| | | ADDRESS MAP | | |
|---|---|---|---|---|
| ID | VER | Foreign Key (EmployeeID) | Vmin | Vmax |
| A1 | 1 | E1 | 1 | 2 |
| A1 | 2 | E1 | 3 | ∞ |

Figure 6:
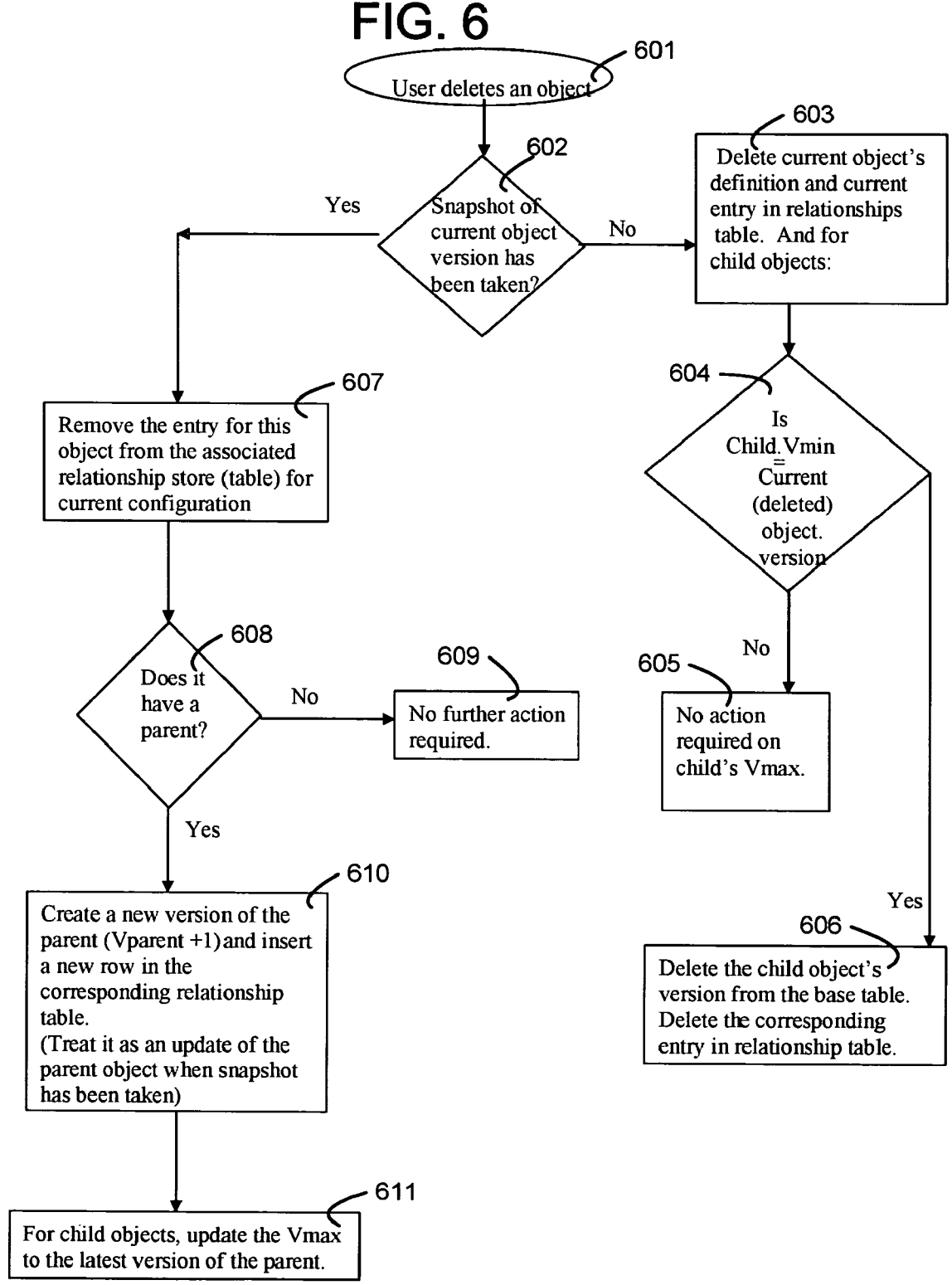

When deleting a previously-inserted object (as per act 601 in FIG. 6), a check is made whether a snapshot of the object has been taken as per act 602 (i.e. whether a configuration to which the object belongs has been copied). If in act 602 it is found that the snapshot was not taken, then the object's row in the definition table and in the map table are deleted if the object is a primary object (as per act 603). If the to-be-deleted object is a secondary object, then it has a parent, and in such cases a check is made (as per act 604) as to whether the Vmin of the child object is same as the current version number of the parent, and if so the child object and its relationships are deleted (as per act 606). Note that if the answer in act 604 is no then no further action is required (as per act 605).

When deleting a previously-inserted object, if in act 602 it is found that a snapshot of the object was taken, then a row for the object is deleted from the map table (as per act 607). Note that since this row may be in use by another configuration, as per act 602, the row is left unchanged (i.e. not deleted) in the definition table. Next, a check is made as to whether the object has a parent (as per act 608), and if not then no further action is required (as per act 609). However if in act 608, the answer is yes, then a new version of the parent is created in the parent's definition table (as per act 610) and a new row is also created in the parent's mapping table (also in act 610), followed by updating the Vmax of the child object to the latest version of the parent.

Consider an example wherein a snapshot has been taken, and the user decides to delete a secondary object. The current version of child object is valid for all parent versions up until now. Hence during the deletion, the Vmax value for current version of the secondary object is set to the current version of its immediate parent, and the immediate parent of the secondary object is versioned.

Specifically, when starting from STATE 4, if an address is being deleted, the Vmax value for the current version of the address object is set to the current version of employee object (which is 4). Moreover, a new version, version 5, of the employee (parent object) is created by adding rows to the EMPLOYEE MAP and EMPLOYEE DEFINITION tables. This latest version of the EMPLOYEE object does not have any address (child). After the above-described changes, the tables appear as follows (also referred to as STATE 5):

| | Dept | |
|---|---|---|
| EID | Ver | Name |
| D1 | 1 | Dept_1 |
| D1 | 2 | Dept_1' |

| | Dept_Relationships | |
|---|---|---|
| CFG | Ver | EID |
| C1 | 1 | D1 |
| C2 | 1 | D1 |
| C3 | 2 | D1 |
| C4 | 2 | D1 |
| C5 | 2 | D1 |

| | Emp | |
|---|---|---|
| EID | Ver | Name |
| E1 | 1 | Emp_1 |
| E1 | 2 | Emp_1' |
| E1 | 3 | Emp_1' |

| | Emp_Relationships | | |
|---|---|---|---|
| CFG | Ver | EID | FK(EID) |
| C1 | 1 | E1 | D1 |
| C2 | 2 | E1 | D1 |
| C3 | 2 | E1 | D1 |
| C4 | 3 | E1 | D1 |
| C5 | 4 | E1 | D1 |

| | Address | |
|---|---|---|
| EID | Name | Ver |
| A1 | Addr_1 | 1 |
| A1 | Addr_1' | 2 |

| | Addr_Relationships | | | |
|---|---|---|---|---|
| EID | Ver | FK (EID) | Min Ver | Max Ver |
| A1 | 1 | E1 | 1 | 2 |
| A1 | 2 | E1 | 3 | 3 |

Consider an example wherein a snapshot has been taken for configuration C4 (i.e. after STATE 4), and the user decides to delete the employee object in configuration C5. The corresponding row in employee map table is deleted and the address object's Vmax is left as is. Note that the version 3 of employee is still left in the definition table because this row is used by another CFG, as per act 602. So if another user creates a version 4 of employee object in a configuration C6, his work would not be impacted. After the above-described changes, the tables appear as follows (also referred to as STATE 5.1):

Dept

| EID | Ver | Name |
|---|---|---|
| D1 | 1 | Dept_1 |
| D1 | 2 | Dept_1' |

Dept_Relationships

| CFG | Ver | EID |
|---|---|---|
| C1 | 1 | D1 |
| C2 | 1 | D1 |
| C3 | 2 | D1 |
| C4 | 2 | D1 |
| C5 | 2 | D1 |

Emp

| EID | Ver | Name |
|---|---|---|
| E1 | 1 | Emp_1 |
| E1 | 2 | Emp_1' |
| E1 | 3 | Emp_1' |
| E1 | 4 | Emp_1'' |

Emp_Relationships

| CFG | Ver | EID | FK(EID) |
|---|---|---|---|
| C1 | 1 | E1 | D1 |
| C2 | 2 | E1 | D1 |
| C3 | 2 | E1 | D1 |
| C4 | 3 | E1 | D1 |
| C5 [DELETED] | 3 | E1 | D1 |
| C6 | 4 | E1 | D1 |

Address

| EID | Name | Ver |
|---|---|---|
| A1 | Addr_1 | 1 |
| A1 | Addr_1' | 2 |

Addr_Relationships

| EID | Ver | FK (EID) | Min Ver | Max Ver |
|---|---|---|---|---|
| A1 | 1 | E1 | 1 | 2 |
| A1 | 2 | E1 | 3 | * |

DEPARTMENT DEFINITION

| ID | Ver | Name |
|---|---|---|
| D1 | 1 | Dept_1 |

DEPARTMENT MAP

| CFG | Ver | ID |
|---|---|---|
| C11 | 1 | D1 |
| C21 | 1 | D1 |
| C31 | 1 | D1 |
| C41 | 1 | D1 |

LOCATION DEFINITION

| ID | Ver | Name |
|---|---|---|
| L1 | 1 | Loc_1 |

LOCATION MAP

| CFG | Ver | ID |
|---|---|---|
| C11 | 1 | E1 |
| C21 | 1 | E1 |
| C31 | 1 | E1 |
| C41 | 1 | E1 |

EMPLOYEE DEFINITION

| ID | Ver | Name | Last Name | Designation | Email | Tel | Cell |
|---|---|---|---|---|---|---|---|
| E1 | 1 | John | Smith | Manager | Jsmith@xyz.com | xxx-xxx-xxxx | yyy-yyy-yyyy |

EMPLOYEE MAP

| CFG | Ver | ID | FK1(ID) Dept | FK2(ID) Location |
|---|---|---|---|---|
| C11 | 1 | E1 | D1 | L1 |
| C21 | 1 | E1 | D2 | L1 |
| C31 | 1 | E1 | D1 | L2 |
| C41 | 1 | E1 | D2 | L2 |

In several embodiments of the type described above, a change in relationships of employee does not cause a version creation. This feature supports multiple workspaces for different users of the same version of the object.

As evident from the above tables, if the relationships of an object change in different configurations, it is not necessary to create a new version of the object in the definition table. Only new entries in the map table are changed and maintained consistently to store the required information.

Several embodiments of the invention implement a repository in a relational database in a computer 710 (FIG. 7) by use of tables 717 to hold objects that are identified by a design time configuration.

In certain embodiments, each query that may be issued by a user is used to define (ahead of the time of issuance of the query) a corresponding view, e.g. for all queries that may be issued, views 714 are set up for the tables 717, and in addition a number of triggers 716 are set up on tables 717.

As is well known in the art, a view is a presentation of certain data contained in one or more tables or other views. Specifically, views take the output of a query and treat that output as a table, and hence a view may be thought of as a stored query, or a virtual table. Views can be used in most of the software programs at locations where tables are normally used, e.g. one can query views, and with some restrictions, one can update, insert into and delete from views. However, a view is not allocated any storage (other than for a query) because the view is defined by the query that extracts or derives data that is stored in tables. All operations performed on a view actually affect the data in a table (also called "base table") of the view and are subject to the integrity constraints and triggers of the base tables. The just-described base table can be itself a view or an actual table.

Also as is well known in the art, a trigger is a procedure written in a programming language, such as PL/SQL, Java or C, to execute (fire) implicitly whenever a table or view is modified or when some user actions or database system actions occur. Triggers can be written to fire whenever one of the following operations occur: DML statements on a particular schema object (Insert/Update/Delete), DDL statements issued within a schema or database, user logon or logoff events, server errors, database startup, or instance shutdown. In the embodiments illustrated in FIG. 7, certain type of triggers that are known in the art as "INSTEAD OF" triggers are used in software (called "versioning package") 716, to transparently modify views that cannot be modified directly through DML statements. Specifically, programmed computer 710 fires triggers 716 instead of executing the triggering statement (Insert/Update/Delete). In some embodiments, versioning package 716 performs maintenance of all version columns transparently by use of PL/SQL in the database.

In addition to views 714, programmed computer 710 also includes a layer of software 713 (called "persistency service") which maps the objects in a programming language (such as Java) into rows of a relational database (such as Oracle). Programmed computer 710 also includes software (called "user interface") 711 that interfaces in a graphical manner with the user.

Figure 8:
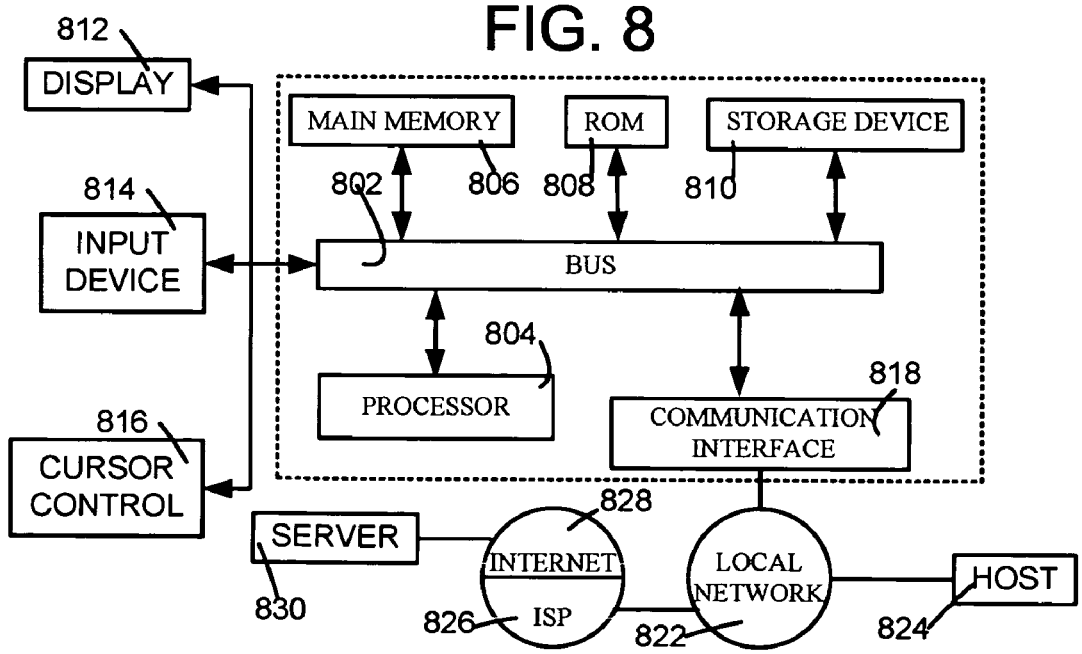
FIG. 8 illustrates, in a high level block diagram, various hardware components used in some embodiments of a computer programmed in accordance with the invention.

Computer 710 may contain any hardware normally used to implement computers. For example, in some embodiments, computer 710 may be implemented as a computer system 800 illustrated in FIG. 8 and described below. Specifically, computer system 800 includes a bus 802 (FIG. 8) or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

As described elsewhere herein, versioning is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. Local network 822 may interconnect computer 710 (described above) to another computer. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for implementing fine grain versioning within software configuration management systems as described herein.

The received code may be executed by processor 804 as it is received, and/or stored in storage device 810, or other non-volatile storage for later execution. In this manner, computer system 800 may obtain application code in the form of a carrier wave.

In several embodiments of the type described herein, the Vmin-Vmax defines the range of versions of a first class object for which a secondary object is valid. It also defines the same range between a child and a parent of such embodiments. This child and parent may both be second class objects themselves, depending on the embodiment and the example.

A comparison of the efficiency obtained by various methods of the type described herein over the methods taught by Thomas et al. in U.S. Pat. No. 6,460,052 is illustrated in the following table.

|  |  | THEN FOLLOWING OBJECT MARKED √ MUST BE VERSIONED (BUT OBJECT MARKED X IS NOT VERSIONED) | | | | |
|---|---|---|---|---|---|---|
|  |  | Employee | Location | Address | Phone Number | Scheme |
| IF THE OBJECT BEING CHANGED IS | Employee | √<br>√ | √<br>X | √<br>X | √<br>X | Thomas et al<br>Embodiments 1 and 2 |
|  | Location | √<br>√ | √<br>√ | √<br>X | √<br>X | Thomas et al<br>Embodiments 1 and 2 |
|  | Address | √<br>X<br>√ | √<br>√<br>√ | √<br>√<br>√ | √<br>X<br>X | Thomas et al<br>Embodiment 1<br>Embodiment 2 |
|  | Phone Number | √<br>X<br>√ | √<br>X<br>√ | √<br>√<br>√ | √<br>√<br>√ | Thomas et al<br>Embodiment 1<br>Embodiment 2 |

As seen in the above table, if any object is changed, then Thomas et al. require that all objects related to the changed object must be versioned, regardless of whether the relationship is that of a parent or of a child. In contrast, when the object Employee is changed, then in all embodiments of the invention described herein, only the Employee object itself is versioned and all objects contained therein remain unchanged. Moreover, if a secondary object Location is changed, then in all embodiments of the invention, the object Location is versioned and only its immediate parent object Employee is versioned (because it is a first class object). All other objects remain unchanged.

In one embodiment of the invention (illustrated in the above table as Embodiment 1), if the object being changed is a secondary object whose immediate parent is also a secondary object, then only the immediate parent object is versioned. For example, in Embodiment 1 if the Address object is changed then only the Location object is versioned and if the Phone number object is changed then only the Address object is versioned. In the just-described Embodiment 1, there is no chain reaction at all. Note that in Embodiment 1, if the object being changed is a primary object then only the object itself is versioned. Note also that in Embodiment 1, if the object being changed is a secondary object whose parent is a primary object, then both objects are versioned (i.e. the secondary object and the primary object are both versioned).

In another embodiment of the invention (illustrated in the above table as Embodiment 2), if the object being changed is a secondary object whose immediate parent is also a secondary object, then the object itself and all the ancestor objects are versioned. For example, in Embodiment 2 if the Address object is changed then Location and Employee are versioned and if the Phone number object is changed then Address, Location and Employee are versioned. In the just-described Embodiment 2, there is a vertical upward chain reaction, but there is no horizontal chain reaction and there is no vertical downward chain reaction. Note that in Embodiment 2, if the object being changed is a primary object then only the object itself is versioned. Note also that in Embodiment 2, if the object being changed is a secondary object whose parent is a primary object, then both objects are versioned (i.e. the secondary object and the primary object are both versioned).

Numerous modifications and adaptations of the embodiments and examples described herein will be apparent to the skilled artisan in view of the disclosure. Numerous such modifications and adaptations are encompassed by the attached claims.

The invention claimed is:

1. A method of managing a repository containing multiple versions of an object, the method comprising:
    inserting into a first table a first row comprising at least one attribute of a first object, an identifier of the first object, and a version number of the first object; and
    inserting into a second table a second row comprising the version number of the first object, the identifier of the first object, an identity of a configuration wherein the first object exists, and at least one identifier of a second object to which said first object is related in said configuration.

2. The method of claim 1 further comprising:
    receiving a query for the first object and for the second object related to the first object in said configuration;
    using the configuration to retrieve from the second table: the version number, the identity of the first object, and the identity of the second object;
    using the version number and the identity of the first object to retrieve from the first table: the attribute of the first object;
    using the configuration and the identity of the second object to retrieve from a third table: the version number of the second object; and
    using the version number of the second object and the identity of the second object to retrieve from a fourth table: an attribute of the second object.

3. The method of claim 1 further comprising:
    checking if the first object has a parent object and if a copy of the parent object exists in a previously stored configuration and if both conditions are true, inserting a third row for the parent object in a third table using the identifier of the parent object, and an incremented version number of the parent object, and inserting a fourth row into a fourth table using the incremented version number of the parent object, the identifier of the parent object, and an identity of the configuration wherein the first object exists.

4. The method of claim 3 wherein the second table has a column for a minimum version number of the parent object and another column for a maximum version number of the parent object, and the method further comprises:
    if both of said conditions are true, storing in the second row the incremented version number of the parent object as the minimum version number;
    if a copy of the parent object does not exist in a previous configuration then storing in the second row the version number of the parent object as the minimum version number; and
    setting the maximum version number as infinity.

5. The method of claim 1 further comprising receiving an instruction to update the first object, and checking if a copy of the first object exists in a previous configuration and if not, updating the object.

6. The method of claim 5 wherein if a copy of the first object exists in a previous configuration, the method further checking if the first object has a parent object and if not, inserting a new row in the first table for the first object using an incremented version number and inserting a new row in the second table for relationships of the first object.

7. The method of claim 6 further comprising checking if a copy of the parent object exists in a previous configuration and if true:
    inserting a third row for the parent object in a third table using an identifier of the parent object and an incremented version number of the parent object;
    inserting a fourth row into a fourth table using the incremented version number of the parent object and the identifier of the parent object;
    setting in the second table a maximum version number of the parent object to be the version number of the parent object prior to incrementing;
    inserting into the first table a fifth row comprising said attribute of the first object, the identifier of the first object, and an incremented version number of the first object;
    inserting into the second table a sixth row comprising the incremented version number of the first object, the identifier of the first object, the incremented version number of the parent object as a minimum number of the parent object and infinity as the maximum version number of the parent object.

8. The method of claim 1 wherein said insertings are both performed in response to an instruction to insert first object into the repository, the method further comprising receiving an additional instruction to delete the first object, and checking if a copy of the first object exists in a previous configuration.

9. The method of claim 8 wherein if the result of checking is not true, the method further comprising:
    deleting the first row and the second row from the first table and the second table respectively.

10. The method of claim 9 further comprising:
    checking if the first object has a child object and if so whether a minimum version number of said child object in a third table is same as the version number of the first object in the first table and if so, deleting a row for the child object from the third table and deleting another row for the child object from a fourth table.

11. The method of claim 8 wherein if the result of checking is true, the method further comprising:
    deleting the second row from the second table; and
    checking if the first object has a parent and if true inserting a third row for the parent object in a third table using an identifier of the parent object and an incremented version number of the parent object, inserting a fourth row into a fourth table using the incremented version number of the parent object and the identifier of the parent object, and setting in the second table a maximum version number of the parent object to be the version number of the parent object prior to incrementing.

12. A computer-readable storage medium encoded with a sequence of instructions to perform the acts of claim 1.

13. The computer-readable storage medium of claim 12 further comprising the repository, the second table comprising a first column for holding a maximum version number of a parent of the first object and a second column for holding a minimum version number of the parent of the first object, a current version number of the parent being stored in the second column.

14. A signal embodied in a carrier medium, the signal being encoded with a sequence of instructions to perform the acts of claim 1.

15. A computer comprising:
a storage medium comprising a repository containing multiple versions of a first object;
means, coupled to the storage medium, for inserting into a first table in the repository a first row comprising at least one attribute of the first object, an identifier of the first object, and a version number of the first object; and
means, coupled to the storage medium, for inserting into a second table in the repository a second row comprising the version number of the first object, the identifier of the first object, an identity of a configuration wherein the first object exists, and an identifier of a second object to which said first object is related.

16. A method of managing a repository containing multiple versions of an object, the method comprising:
inserting into a first table, a row for a first object being added to the repository, the first table comprising a column for a minimum version number of a second object and another column for a maximum version number of the second object; and
in response to a query to which a plurality of versions of the first object are responsive, selecting a version of the first object for which a version of the second object falls between the minimum version number and the maximum version number, wherein said version of the second object is responsive to the query.

17. The method of claim 16 wherein the second object contains the first object either directly or indirectly.

18. The method of claim 16 wherein the second object is an immediate parent of the first object.

19. The method of claim 16 wherein the first table is devoid of any information that defines the first object.

20. The method of claim 16 wherein the repository comprises a second table, the second table comprises a column for an identity of a configuration to which the second object belongs, and the first table is devoid of said identity of configuration.

21. The method of claim 16 wherein the first table comprises an additional column for an identity of a configuration to which the first object belongs, and the first table further comprises yet another column for an attribute that at least partially defines the first object.

22. The method of claim 21 wherein the second object is not contained in any other object.

23. A computer-readable storage medium encoded with a sequence of instructions to perform the acts of claim 16.

24. The computer-readable storage medium of claim 23 further comprising the repository, and a second table comprising a pair of columns defining a range of version numbers of a parent of the first object, wherein a current version number of the parent falls within the range.

25. A signal embodied in a carrier medium, the signal being encoded with a sequence of instructions to perform the acts of claim 16.

26. A computer comprising:
a storage medium comprising a repository containing multiple versions of a first object;
means, coupled to the storage medium, for inserting into a first table in the repository a row for a first object to be added to the repository, the first table comprising a column for a minimum version number of a second object and another column for a maximum version number of the second object, wherein a version number of the second object is stored as the minimum version number, and infinity is stored as the maximum version number; and
means, coupled to the storage medium, for selecting a version of the first object for which a version of the second object falls between the minimum version number and the maximum version number, wherein said version of the second object is responsive to a first portion of a query, and a plurality of versions of the first object including said selected version are responsive to a second portion of said query.

* * * * *